(12) United States Patent
Mori et al.

(10) Patent No.: US 12,467,509 B1
(45) Date of Patent: Nov. 11, 2025

(54) RATCHET TYPE CLUTCH DEVICE AND VEHICLE DRIVE DEVICE

(71) Applicant: NSK-WARNER K.K., Tokyo (JP)

(72) Inventors: Ibuki Mori, Shizuoka (JP); Shinji Okada, Shizuoka (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 19/077,753

(22) Filed: Mar. 12, 2025

(30) Foreign Application Priority Data

May 8, 2024 (JP) .................................. 2024-075957

(51) Int. Cl.
  *F16D 41/12* (2006.01)
(52) U.S. Cl.
  CPC .................................. *F16D 41/12* (2013.01)
(58) Field of Classification Search
  CPC .................................................... F16H 41/12
  See application file for complete search history.

(56) References Cited

U.S. PATENT DOCUMENTS

| 2004/0016616 | A1 | 1/2004 | Stefina | |
| 2018/0266503 | A1* | 9/2018 | Shioiri | F16D 41/14 |
| 2019/0293131 | A1* | 9/2019 | Campton | F16D 41/12 |

FOREIGN PATENT DOCUMENTS

| JP | 2020-118250 A | 8/2020 |
| JP | 2022-108425 A | 7/2022 |
| JP | 2022-190947 A | 12/2022 |
| JP | 2023-016209 A | 2/2023 |

OTHER PUBLICATIONS

Decison to Grant a Patent for Japanese Patent Application No. 2024-075957 dated Jul. 2, 2024.

* cited by examiner

*Primary Examiner* — Lori Wu
(74) *Attorney, Agent, or Firm* — Sughrue Mion, PLLC

(57) ABSTRACT

A ratchet type clutch device includes outer and inner rings. A shutter plate of the inner ring has restriction tooth portions formed on an outer peripheral surface thereof. When viewed from an axial direction, a state where the restriction tooth portions are misaligned in a first rotation direction for tooth portions and overlap with a part of grooves is set as a closed state of the shutter plate, and a state where all the restriction tooth portions overlap with the tooth portions is set as an open state of the shutter plate. An elastic member biases the shutter plate from the open state to the closed state. Each of first claw members is formed to be able to enter into the corresponding groove in the closed state, and each of second claw members is formed to be able to enter into the corresponding groove in the open state.

12 Claims, 19 Drawing Sheets

RATCHET TYPE CLUTCH DEVICE AND VEHICLE DRIVE DEVICE

CROSS-REFERENCE TO RELATED APPLICATION(S)

The present application claims priority to and incorporates by reference the entire contents of Japanese Patent Application No. 2024-075957 filed in Japan on May 8, 2024.

BACKGROUND OF THE INVENTION

1. Field of the Invention

The present disclosure relates to a ratchet type clutch device and a vehicle drive device.

2. Description of the Related Art

A ratchet type clutch device of Japanese Patent Application Laid-open No. 2020-118250 includes a set of a first claw member and a second claw member. When an inner ring rotates in one direction relative to an outer ring, the first claw member engages with a tooth portion. In addition, when the inner ring rotates in an opposite direction relative to the outer ring, the second claw member engages with the tooth portion. Hereinafter, a state in which only the first claw member can engage with the tooth portion is referred to as a one-way clutch mode. A state in which the first claw member and the second claw member can engage with the tooth portion is referred to as a lock mode.

In order to switch a mode from the lock mode to the one-way clutch mode, the ratchet type clutch device of Japanese Patent Application Laid-open No. 2020-118250 includes an actuator and a cam member moved in an axial direction by the actuator. The cam member lifts the claw members to release the engagement with the tooth portion. When a movement amount of the cam member in the axial direction is small, the cam member lifts only the second claw member to switch the mode from the lock mode to the one-way clutch mode. In addition, when the movement amount of the cam member is large, the cam member lifts both the first claw member and the second claw member.

However, the ratchet type clutch device of Japanese Patent Application Laid-open No. 2020-118250 includes the actuator and the cam member, and thus is increased in size. Therefore, a ratchet type clutch device capable of being switched from a lock mode to a one-way clutch mode while having a smaller size is demanded.

The present disclosure has been made in view of the above problems, and an object thereof is to provide a ratchet type clutch device capable of being switched from a lock mode to a one-way clutch mode while having a smaller size. In addition, a vehicle drive device including the ratchet type clutch device is provided.

SUMMARY OF THE INVENTION

According to one embodiment, a ratchet type clutch device includes: an outer ring and an inner ring that are relatively rotatable, the inner ring having tooth portions and grooves that are alternately formed on an outer peripheral surface thereof in a circumferential direction. The outer ring includes: a plurality of first claw members that enters into the respective grooves and engages with the respective tooth portions from a first rotation direction; and a plurality of second claw members that enters into the respective grooves and engages with the respective tooth portions from a second rotation direction. The inner ring includes: an inner ring main body in which the tooth portions and the grooves are formed; a shutter plate that is arranged coaxially with the inner ring main body and is rotatable relative to the inner ring main body; and an elastic member that biases the shutter plate in a rotation direction. The shutter plate has a plurality of restriction tooth portions that is arranged at equal intervals with the tooth portions and is formed on an outer peripheral surface thereof. A direction parallel to a rotation axis of the outer ring is set as an axial direction. A state in which the restriction tooth portions are misaligned in the first rotation direction with respect to the tooth portions and overlap with a part of the grooves when viewed from the axial direction is set as a closed state of the shutter plate. A state in which all of the restriction tooth portions overlap with the tooth portions when viewed from the axial direction is set as an open state of the shutter plate. The elastic member biases the shutter plate to switch the state from the open state to the closed state. Each of the first claw members is formed to be able to enter into the corresponding groove in the closed state. Each of the second claw members is formed to be able to enter into the corresponding groove in the open state, a center of gravity is arranged closer to a tip portion than a rotation center of the corresponding second claw member, and the second claw members are released from the respective grooves when a centrifugal force of a predetermined value or more acts.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present disclosure will be described in detail with reference to the accompanying drawings. The present disclosure is not limited by the contents described in the following description. In addition, components described below include those that can be easily assumed by those skilled in the art and those that are substantially the same. Furthermore, the components described below can be appropriately combined.

First Embodiment

First, a ratchet type clutch device 100 will be described, and then a vehicle drive device 200 including the ratchet type clutch device 100 will be described.

Figure 1:
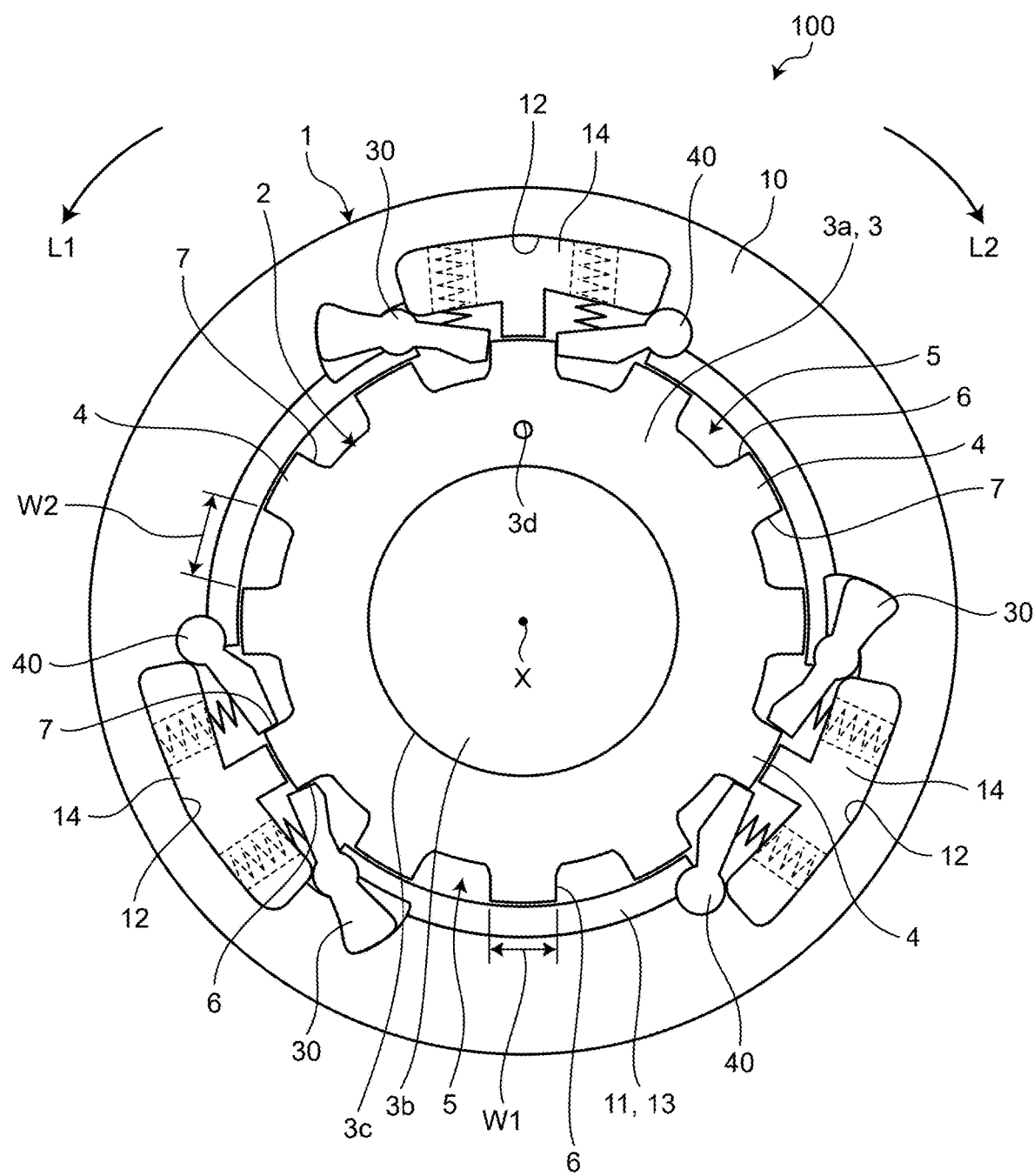
FIG. 1 is a schematic diagram schematically illustrating a ratchet type clutch device of a first embodiment in a state of being viewed from a first direction.
Figure 2:
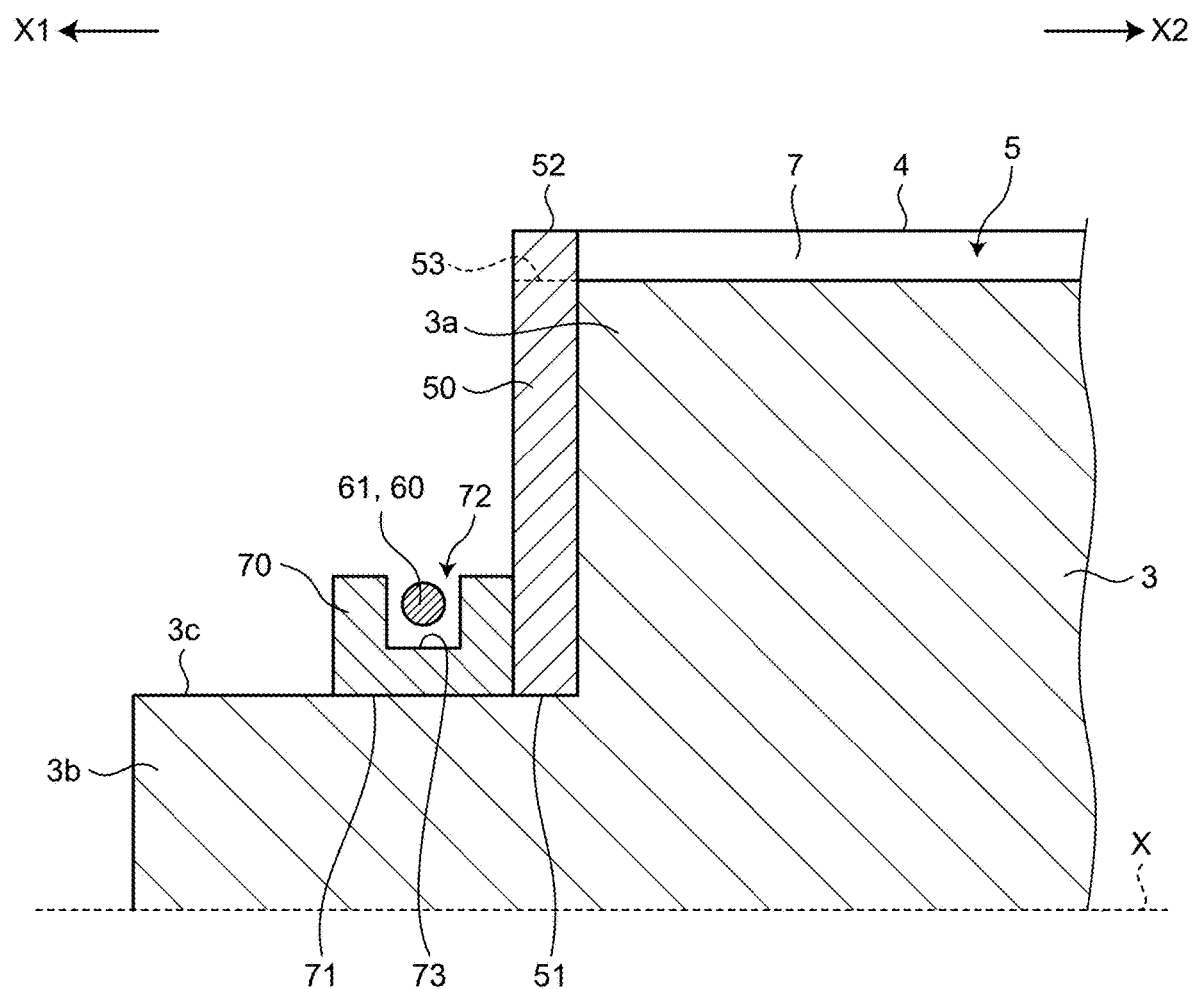
FIG. 2 is a sectional view in an axial direction of an inner ring of the first embodiment, and is specifically a sectional view taken along a line II-II in FIG. 5.

FIG. 1 is a schematic diagram schematically illustrating the ratchet type clutch device 100 of the first embodiment in a state of being viewed from a first direction X1. FIG. 2 is a sectional view in an axial direction of an inner ring 2 of the first embodiment, and is specifically a sectional view taken along a line II-II in FIG. 5. In addition, a state in which a shutter plate 50, an elastic member 60, and a case 70 arranged in the first direction X1 with respect to an inner ring main body 3 are removed is illustrated in FIG. 1 in order to make it easier to view the inner ring main body 3.

As illustrated in FIG. 1, the ratchet type clutch device 100 includes an annular outer ring 1 and an inner ring 2 arranged inside the outer ring 1. The outer ring 1 and the inner ring 2 are arranged coaxially. In addition, the outer ring 1 and the inner ring 2 are arranged in a manner of being relatively rotatable about a central axis X. Hereinafter, a direction parallel to the central axis X is referred to as the axial direction. A direction orthogonal to the central axis X is referred to as a radial direction.

As illustrated in FIG. 2, the inner ring 2 includes the inner ring main body 3, the shutter plate 50, the elastic member 60, and the case 70. Hereinafter, in the axial direction, a direction in which the shutter plate 50 is arranged as viewed from the inner ring main body 3 is referred to as the first direction X1, and an opposite direction is referred to as a second direction X2.

The inner ring main body 3 has a side surface 3a facing the first direction X1. A shaft portion 3b protruding in the first direction X1 is formed on the side surface 3a. As illustrated in FIG. 1, the shaft portion 3b is formed in a columnar shape around the central axis X. Thus, an outer peripheral surface 3c of the shaft portion 3b has a circular shape. In addition, a fixation hole 3d is formed in the side surface 3a. Note that although the inner ring main body 3 and the shaft portion 3b are integrally formed in the first embodiment, a rod-shaped shaft portion 3b may be fitted to an annular inner ring main body 3 in the present disclosure.

As illustrated in FIG. 1, tooth portions 4 and grooves 5 are alternately formed in a circumferential direction in an outer peripheral surface of the inner ring main body 3. A length in the circumferential direction of the tooth portions 4 is W1. The grooves 5 are spaces respectively formed between the tooth portions 4 and open outward in the radial direction. In addition, a width of the grooves 5 in the circumferential direction is W2.

Each of the tooth portions 4 has one side surface 6 facing one side in the circumferential direction and the other side surface 7 facing the other side in the circumferential direction. Hereinafter, with respect to a rotation direction (circumferential direction) about the central axis X, a direction that the one side surface 6 faces is referred to as a first rotation direction L1, and a direction that the other side surface 7 faces is referred to as a second rotation direction L2. Note that the shutter plate 50, the elastic member 60, and the case 70 will be described later.

The outer ring 1 includes an annular outer ring main body 10, an annular retainer 11 arranged on an inner peripheral side of the outer ring main body 10, a plurality of first claw members 30, and a plurality of second claw members 40.

An inner peripheral surface of the outer ring main body 10 is circular around the central axis X. A fitted portion 12 recessed outward in the radial direction is formed in the inner peripheral surface of the outer ring main body 10. The retainer 11 includes a retainer main body 13 extending along the inner peripheral surface of the outer ring main body 10 and a fitting portion 14 fitted to the fitted portion 12 of the outer ring main body 10.

Figure 3:
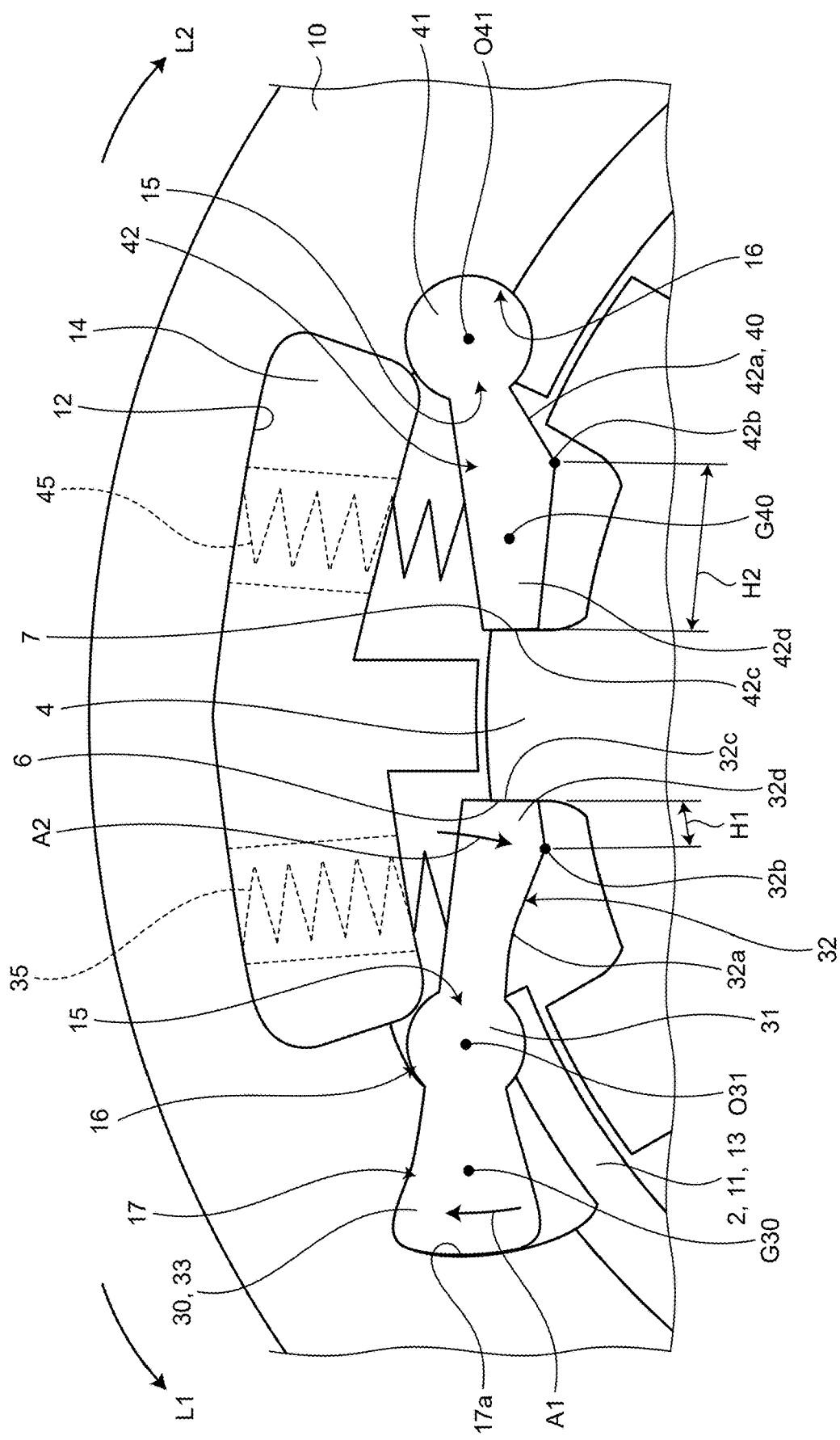
FIG. 3 is an enlarged view of a set of a first claw member and a second claw member in FIG. 1.

FIG. 3 is an enlarged view of a set of the first claw member 30 and the second claw member 40 in FIG. 1. As illustrated in FIG. 3, an opening portion 15 in which a part of the first claw member 30 or the second claw member 40 is arranged on an inner side in the radial direction of the retainer 11 is formed between the retainer main body 13 and the fitting portion 14. In addition, a shaft housing portion 16 is formed at a portion between the outer ring main body 10 and the retainer 11 and adjacent to the opening portion 15. Furthermore, in the shaft housing portion 16, an expanded housing portion 17 is formed in the first rotation direction L1 of the shaft housing portion 16 in which the first claw member 30 is housed.

The first claw member 30 includes a first shaft portion 31 housed in the shaft housing portion 16, a first claw portion 32 protruding from the first shaft portion 31, and a torque transmission portion 33 arranged in the expanded housing portion 17.

The first shaft portion 31 is sandwiched by the outer ring main body 10 and the retainer 11, and is rotatable around a rotation center O31. The first claw portion 32 passes through the opening portion 15 and is arranged on an inner peripheral side of the retainer 11.

The first claw portion 32 has an inner surface 32a facing inward in the radial direction. On the inner surface 32a, a protrusion point 32b that protrudes most inward in the radial direction is formed. Then, the inner surface 32a is inclined so as to be located inward in the radial direction as approaching the protrusion point 32b. A length from an end surface 32c to the protrusion point 32b of the first claw portion 32 is H1. Hereinafter, a range of the length H1 or less from the end surface 32c of the first claw portion 32 is referred to as a first tip portion 32d.

The length H1 of the first tip portion 32d is smaller than the width W2 of the grooves 5. Thus, the first tip portion 32d of the first claw portion 32 enters into the groove 5 and can come into contact with the one side surface 6 of the tooth portion 4. That is, the first claw member 30 is a claw member that engages with the tooth portion 4 in the first rotation direction L1.

The torque transmission portion 33 faces a facing surface 17a of the expanded housing portion 17. When the first claw portion 32 of the first claw member 30 comes into contact with the tooth portion 4, the torque transmission portion 33 presses the facing surface 17a, and torque is transmitted to the outer ring main body 10.

A center of gravity G30 of the first claw member 30 of the present embodiment is arranged in the torque transmission portion 33. Thus, when the centrifugal force acts on the first claw member 30, the torque transmission portion 33 moves outward in the radial direction (see an arrow A1 in FIG. 3). Thus, the first claw portion 32 moves inward in the radial direction (see an arrow A2 in FIG. 3). As a result, a contact area between the first claw portion 32 and the tooth portion 4 increases, and the engagement between the first claw portion 32 and the tooth portion 4 is stabilized. Note that although the center of gravity G30 of the first claw member 30 is arranged in the torque transmission portion 33 in the first embodiment, the center of gravity G30 may be arranged in the first shaft portion 31 in the present disclosure.

As illustrated in FIG. 3, the second claw member 40 includes a second shaft portion 41 housed in the shaft housing portion 16, and a second claw portion 42 protruding from the second shaft portion 41.

The second shaft portion 41 is sandwiched between the outer ring main body 10 and the retainer 11, and is rotatable around a rotation center O41. The second claw portion 42 passes through the opening portion 15 and is arranged on the inner peripheral side of the retainer 11.

The second claw portion 42 has an inner surface 42a facing inward in the radial direction. On the inner surface 42a, a protrusion point 42b that protrudes most inward in the radial direction is formed. Then, the inner surface 42a is inclined so as to be located inward in the radial direction as approaching the protrusion point 42b. A length from an end surface 42c to the protrusion point 42b of the second claw portion 42 is H2. Hereinafter, a range of the length H2 or less from the end surface 42c of the second claw portion 42 is referred to as a second tip portion 42d.

The length H2 of the second tip portion 42d is smaller than the width W2 of the grooves 5. Thus, the second tip portion 42d of the second claw portion 42 enters into the groove 5 and can come into contact with the other side surface 7 of the tooth portion 4. That is, the second claw member 40 is a claw member that engages with the tooth portion 4 in the second rotation direction L2. In addition, the length H2 of the second tip portion 42d is longer than the length H1 of the first tip portion 32d (H2>H1).

The fitting portion 14 is provided with a first spring 35 and a second spring 45 that bias the first claw portion 32 and the second claw portion 42 inward in the radial direction. In addition, a center of gravity G40 of the second claw member 40 is arranged in the second claw portion 42. That is, the center of gravity G40 of the second claw member 40 is closer to the end surface 42c than the rotation center O41 of the second claw member 40. Thus, when the outer ring 1 rotates and the centrifugal force of a predetermined value or more acts on the second claw member 40, the second claw portion 42 moves outward in the radial direction against the second spring 45.

Figure 4:
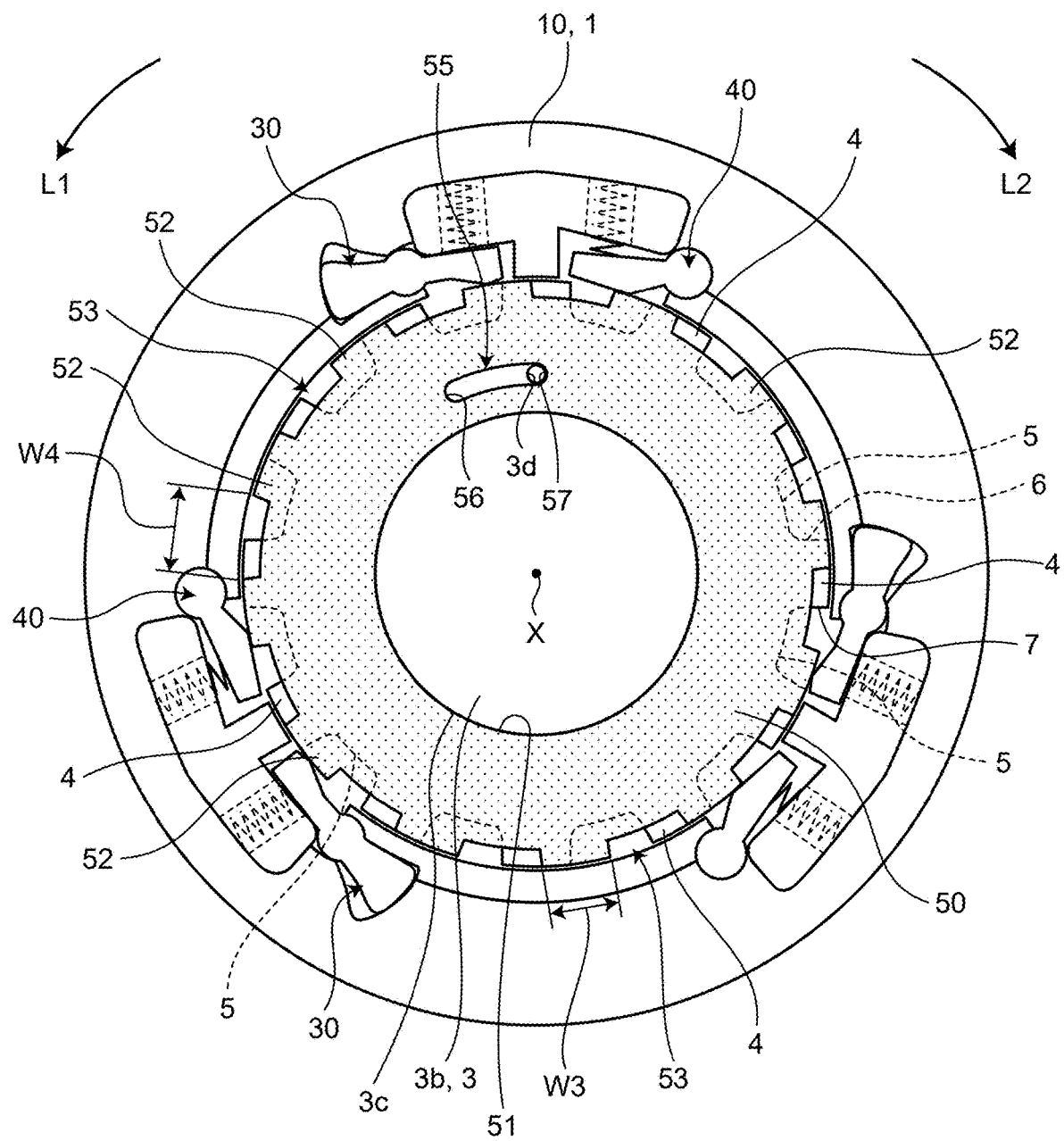
FIG. 4 is a schematic diagram schematically illustrating the ratchet type clutch device of the first embodiment in the state of being viewed from the first direction.

FIG. 4 is a schematic diagram schematically illustrating the ratchet type clutch device 100 of the first embodiment in a state of being viewed from the first direction X1. Note that a state in which the elastic member 60 and the case 70 are removed is illustrated in FIG. 4 in order to make it easier to view the shutter plate 50. Furthermore, dots are assigned to the shutter plate 50 in FIG. 4 and subsequent drawings.

The shutter plate 50 is an annular part centered on the central axis X. An inner peripheral surface 51 of the shutter plate 50 is formed in a circular shape. The inner peripheral surface 51 of the shutter plate 50 is slidably fitted to the outer peripheral surface 3c of the shaft portion 3b. Thus, the shutter plate 50 is rotatable relative to the inner ring main body 3.

On an outer peripheral surface of the shutter plate 50, restriction tooth portions 52 and restriction grooves 53 are alternately formed in the circumferential direction. The restriction tooth portions 52 are arranged in the circumferential direction at equal intervals with the tooth portions 4. A length W3 in the circumferential direction of the restriction tooth portions 52 is equal to the length W1 of the tooth portions 4 (see FIG. 1). The restriction grooves 53 are spaces respectively formed between the restriction tooth portions 52 and open outward in the radial direction. A width W4 in the circumferential direction of the restriction grooves 53 is equal to the width W2 of the grooves 5 (see FIG. 1).

Note that although the length W3 of the restriction tooth portions 52 is equal to the length W1 of the tooth portions 4 and the width W4 of the restriction grooves 53 is equal to the width W2 of the grooves 5 in the present embodiment, the present disclosure is not limited thereto. For example, the length W3 of the restriction tooth portions 52 may be shorter than the length W1 of the tooth portions 4 and the width W4 of the restriction grooves 53 may be larger than the width W2 of the grooves 5.

A circular-arc hole 55 penetrating in the axial direction is formed in the shutter plate 50. Hereinafter, in an inner peripheral surface of the circular-arc hole 55, a surface located at an end portion in the first rotation direction L1 is referred to as a locking surface 56, and a surface placed at an end portion in the second rotation direction L2 is referred to as a positioning surface 57.

Figure 5:
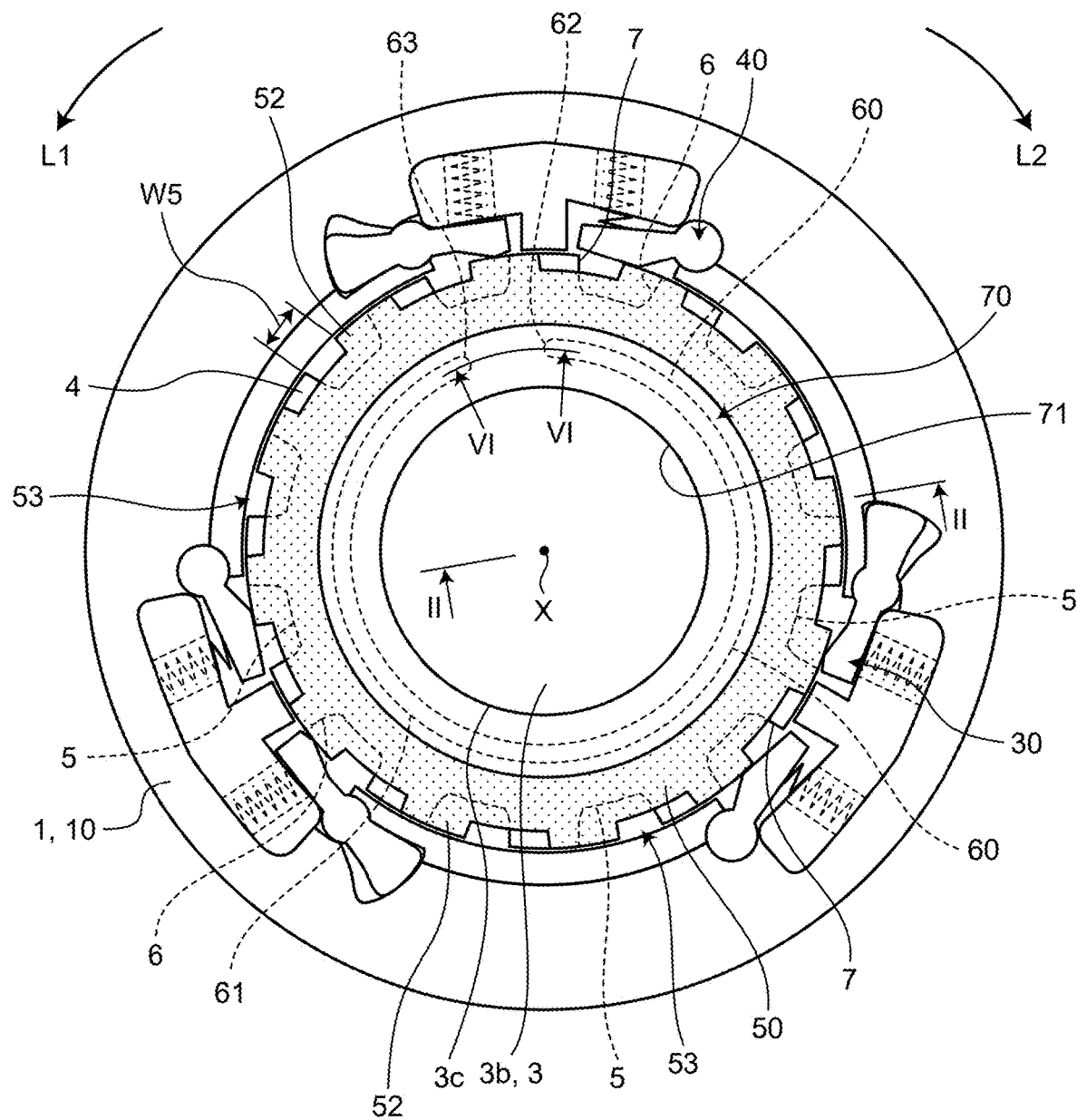
FIG. 5 is a schematic diagram schematically illustrating the ratchet type clutch device of the first embodiment in the state of being viewed from the first direction.

FIG. 5 is a schematic diagram schematically illustrating the ratchet type clutch device 100 of the first embodiment in a state of being viewed from the first direction X1. The case 70 is an annular part. An inner peripheral surface 71 of the case 70 is formed in a circular shape. The inner peripheral surface 71 of the case 70 is fitted to the shaft portion 3b of the inner ring main body 3. As illustrated in FIG. 2, a housing groove 72 recessed inward in the radial direction and extending in the circumferential direction is formed on the outer peripheral surface of the case 70.

Figure 6:
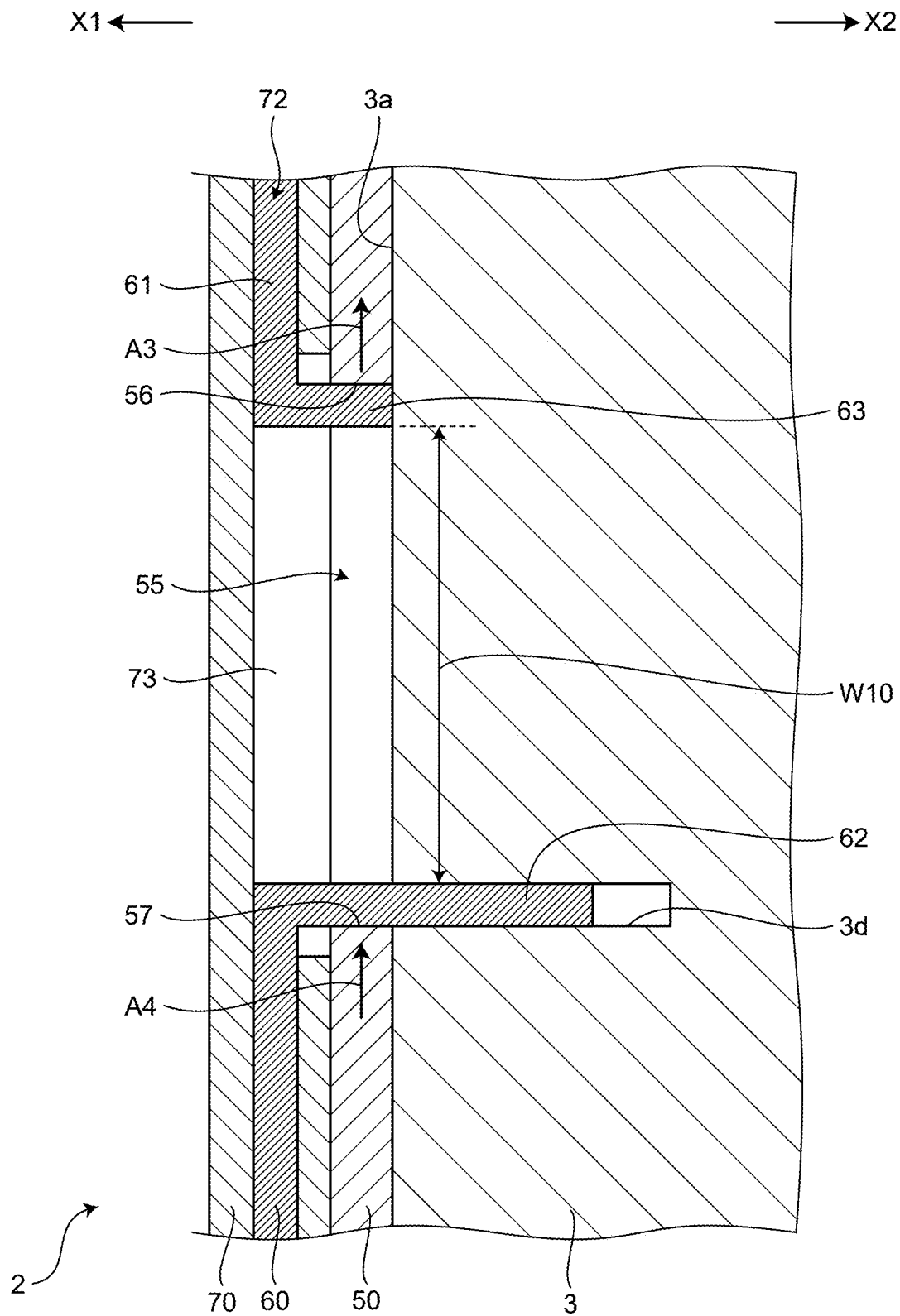
FIG. 6 is a sectional view taken along a line VI-VI in FIG. 5.

The elastic member 60 includes a C-shaped main body portion 61, a rotation restriction portion 62 (see FIG. 6), and a locking portion 63 (see FIG. 6). As illustrated in FIG. 2, the main body portion 61 is housed in the housing groove 72 of the case 70. Thus, the elastic member 60 is supported by the case 70 in such a manner as not to fall off in the first direction X1. In addition, the main body portion 61 is separated from a bottom surface 73 of the housing groove 72. Thus, the main body portion 61 is supported so as to be deformable (reduced in diameter).

FIG. 6 is a sectional view taken along a line VI-VI in FIG. 5. As illustrated in FIG. 6, the rotation restriction portion 62 extends in the second direction X2 from an end portion of the main body portion 61 in the first rotation direction L1. In addition, the rotation restriction portion 62 passes through the circular-arc hole 55 and is inserted into the fixation hole 3*d* of the inner ring main body 3. Thus, the rotation restriction portion 62 is fixed to the inner ring main body 3.

The locking portion 63 extends in the second direction X2 from an end portion in the second rotation direction L2 of the main body portion 61. In addition, the locking portion 63 is inserted into the circular-arc hole 55 of the shutter plate 50. The locking portion 63 is arranged at an end portion in the first rotation direction L1 of the circular-arc hole 55 and abuts on the locking surface 56 of the circular-arc hole 55.

In addition, the elastic member 60 is assembled to the inner ring main body 3 and the shutter plate 50 in a state in which a diameter of the main body portion 61 is reduced. That is, the distance W10 between the rotation restriction portion 62 and the locking portion 63 (see FIG. 6) is larger before assembly than after assembly. Thus, the locking portion 63 constantly presses the locking surface 56 in the first rotation direction L1 (see an arrow A3 in FIG. 6). Thus, the shutter plate 50 is biased in such a manner as to rotate in first rotation direction L1 (see an arrow A4 in FIG. 6), and a positioning surface 57 abuts on the rotation restriction portion 62.

As illustrated in FIG. 5, when the positioning surface 57 abuts on the rotation restriction portion 62, a phase of the shutter plate 50 is in such a manner that the restriction tooth portions 52 are misaligned in the first rotation direction L1 with respect to the tooth portions 4. That is, when viewed from the axial direction, the restriction tooth portions 52 overlap with a part of the grooves 5. In this state, the size of the claw members that can enter into the grooves 5 is limited to W5. Hereinafter, a state in which the positioning surface 57 abuts on the rotation restriction portion 62 (the restriction tooth portions 52 overlap with the part of the grooves 5) is referred to as a closed state of the shutter plate 50 (or simply "closed state").

In addition, the shutter plate 50 in the closed state can rotate relative to the inner ring main body 3 in the second rotation direction L2. In other words, the inner ring main body 3 can rotate relative to the shutter plate 50 in the first rotation direction L1. Then, when the inner ring main body 3 relatively rotates in the first rotation direction L1, the restriction tooth portions 52 and the tooth portions 4 overlap in the axial direction (see FIG. 9 and FIG. 10). Thus, the size of the claw members that can enter into the grooves 5 returns to W2 (see FIG. 1). Hereinafter, a state in which all of the restriction tooth portions 52 overlap with the tooth portions 4 when viewed from the axial direction is referred to as an open state of the shutter plate 50 (or simply an "open state").

Next, an operation example of the ratchet type clutch device 100 will be described. A first state described in the present description is the closed state illustrated in FIG. 5 (W5 is the size that allows an entry into the groove 5). In addition, the first claw member 30 and the second claw member 40 are not engaged with the tooth portions 4.

Figure 7:
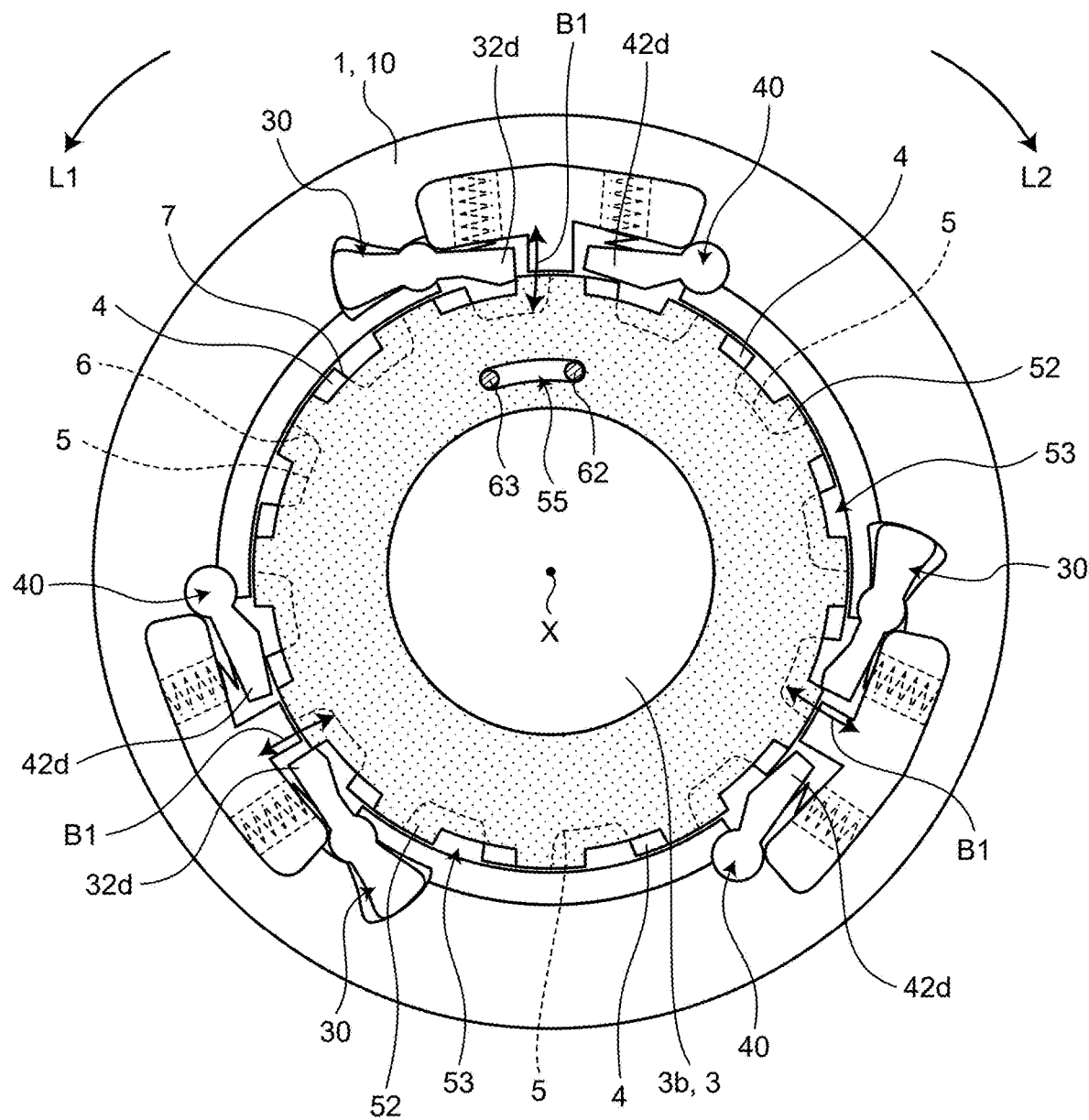
FIG. 7 is a schematic diagram illustrating a state of when an inner ring rotates in a second rotation direction relative to an outer ring in the first embodiment.

FIG. 7 is a schematic diagram illustrating a state of when the inner ring 2 rotates in the second rotation direction L2 relative to the outer ring 1 in the first embodiment. Note that illustration of the main body portion 61 of the elastic member 60 and the case 70 is omitted in FIG. 7 and subsequent drawings. In a case where the inner ring 2 rotates in the second rotation direction L2 relative to the outer ring 1 from the state illustrated in FIG. 5, the second tip portions 42*d* of the second claw members 40 do not enter into the grooves 5. Thus, the second claw members 40 do not engage with the tooth portions 4. In addition, the first tip portions 32*d* of the first claw members 30 enter into the grooves 5 but do not engage with the tooth portions 4. Thus, the first tip portions 32*d* of the first claw members 30 enter into the grooves 5 or ride on the tooth portions 4 and swing (see arrows B1 in FIG. 7).

Figure 8:
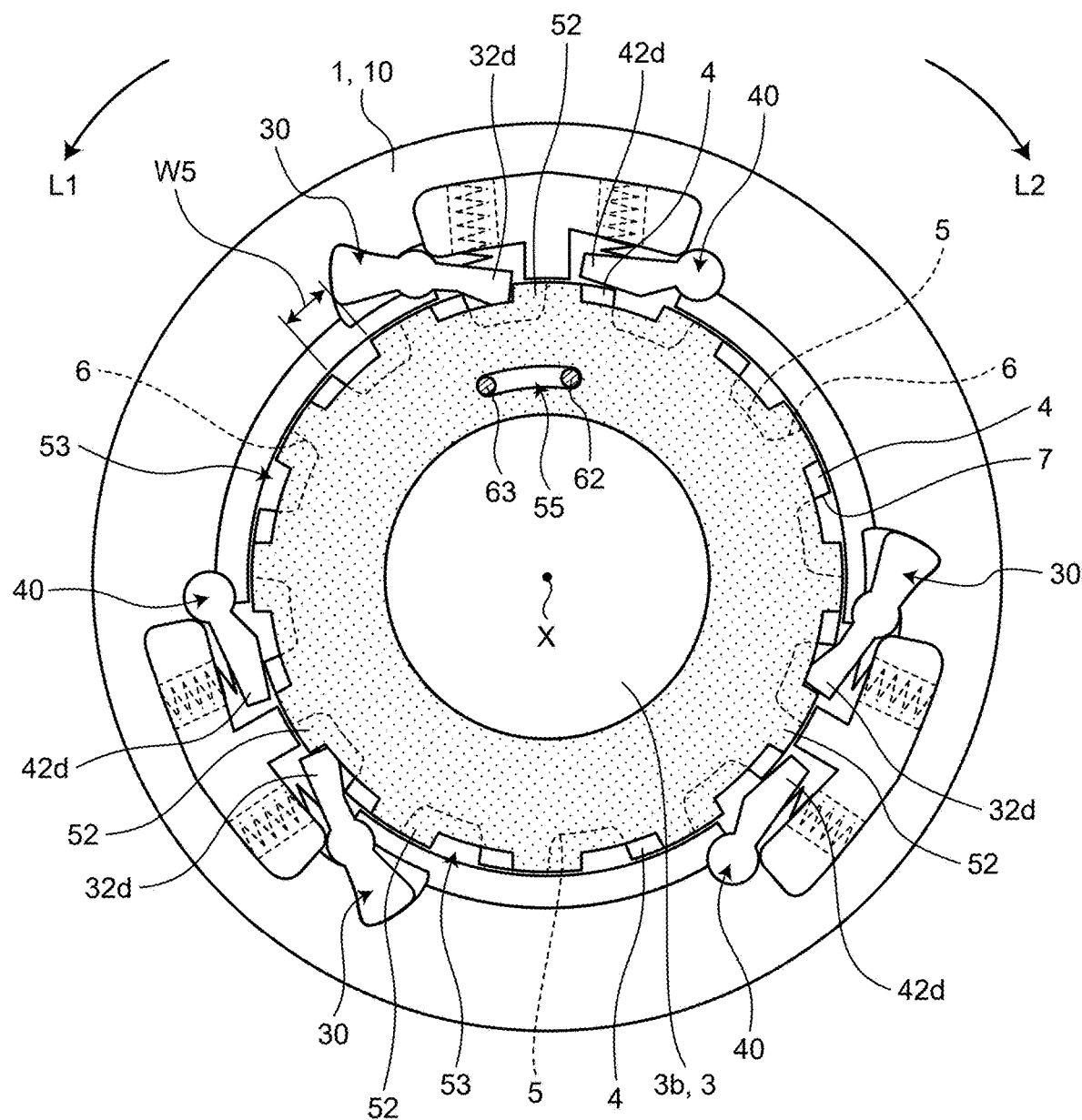
FIG. 8 is a schematic diagram illustrating a state in which the inner ring starts rotating in a first rotation direction relative to the outer ring in the first embodiment.

FIG. 8 is a schematic diagram illustrating a state in which the inner ring 2 starts rotating in the first rotation direction L1 relative to the outer ring 1 in the first embodiment. On the other hand, at a time point at which the inner ring 2 starts rotating in the first rotation direction L1 relative to the outer ring 1 from the state illustrated in FIG. 5, the size that can enter into the grooves 5 is W5 as illustrated in FIG. 8. Thus, the second tip portions 42*d* of the second claw members 40 cannot enter into the grooves 5. On the other hand, the first tip portions 32*d* of the first claw members 30 enter into the grooves 5 and come into contact with the restriction tooth portions 52. As a result, the rotation of the shutter plate 50 in the first rotation direction L1 is restricted. Thus, only the inner ring main body 3 rotates in the first rotation direction L1.

Figure 9:
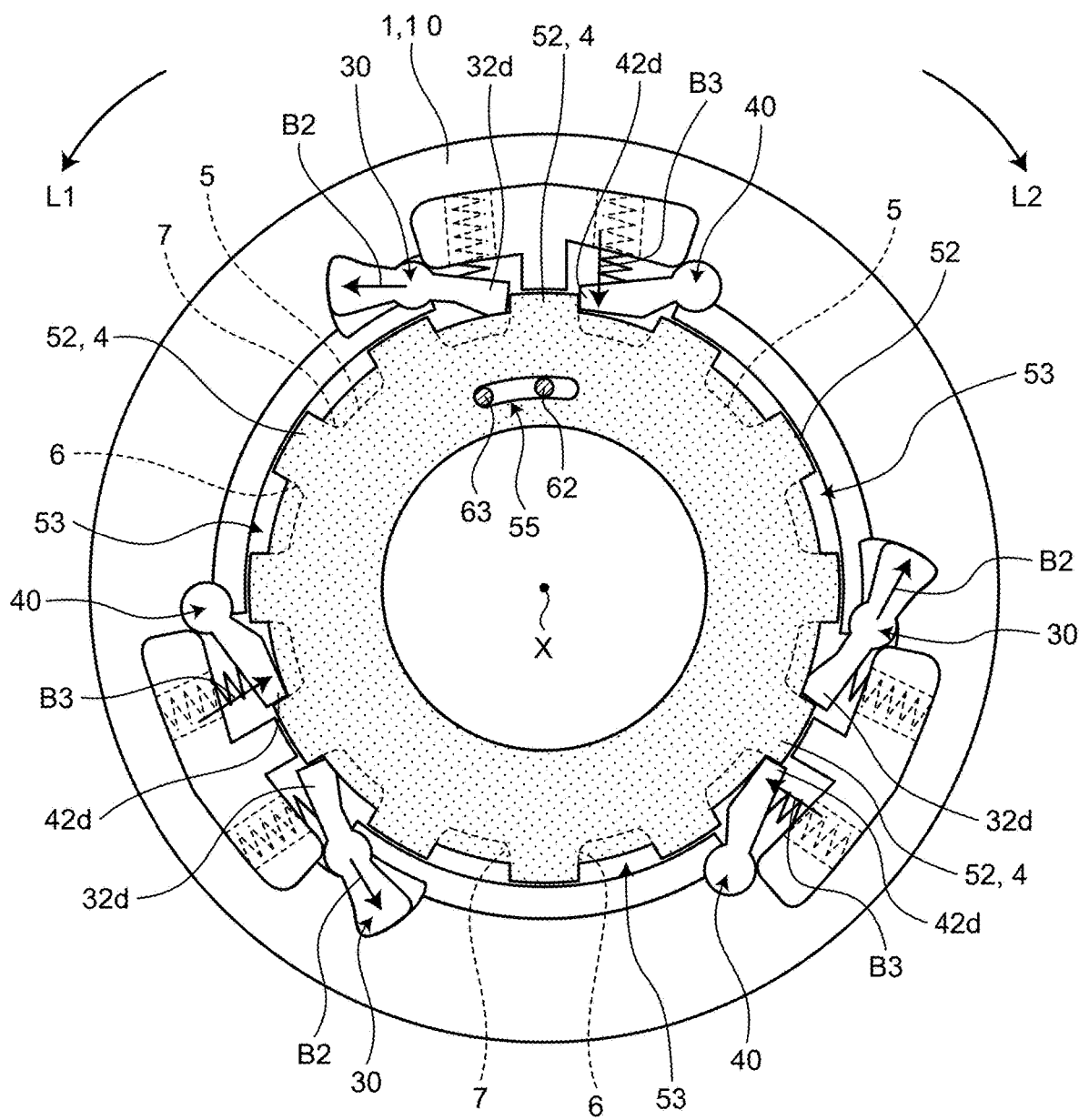
FIG. 9 is a schematic diagram illustrating a state in which the inner ring further rotates in the first rotation direction relative to the outer ring from the state of FIG. 8.

FIG. 9 is a schematic diagram illustrating a state in which the inner ring 2 further rotates in the first rotation direction relative to the outer ring 1 from the state of FIG. 8. Then, when only the inner ring main body 3 rotates in the first rotation direction L1, as illustrated in FIG. 9, the tooth portions 4 of the inner ring main body 3 come into contact with the first tip portions 32*d* of the first claw members 30. That is, the first claw members 30 are in a state of being engaged with the tooth portions 4. As a result, the torque in the first rotation direction L1 is transmitted to the outer ring main body 10 via the first claw members 30 (see arrows B2 in FIG. 9), and the outer ring 1 rotates in the first rotation direction L1 at the same speed as the inner ring 2.

In addition, the state illustrated in FIG. 9 is a state in which both the restriction tooth portions 52 and the tooth portions 4 abut on the first tip portions 32*d*. That is, phases of the inner ring main body 3 and the shutter plate 50 coincide with each other, and the shutter plate 50 is brought into the open state. Thus, the second tip portions 42*d* of the second claw members 40 enter into the grooves 5 (see arrows B3 in FIG. 9) and are brought into a state of being able to engage with the tooth portions 4. According to the above, the outer ring 1 and the inner ring 2 are brought into the lock mode in which the relative rotation is restricted.

Figure 10:
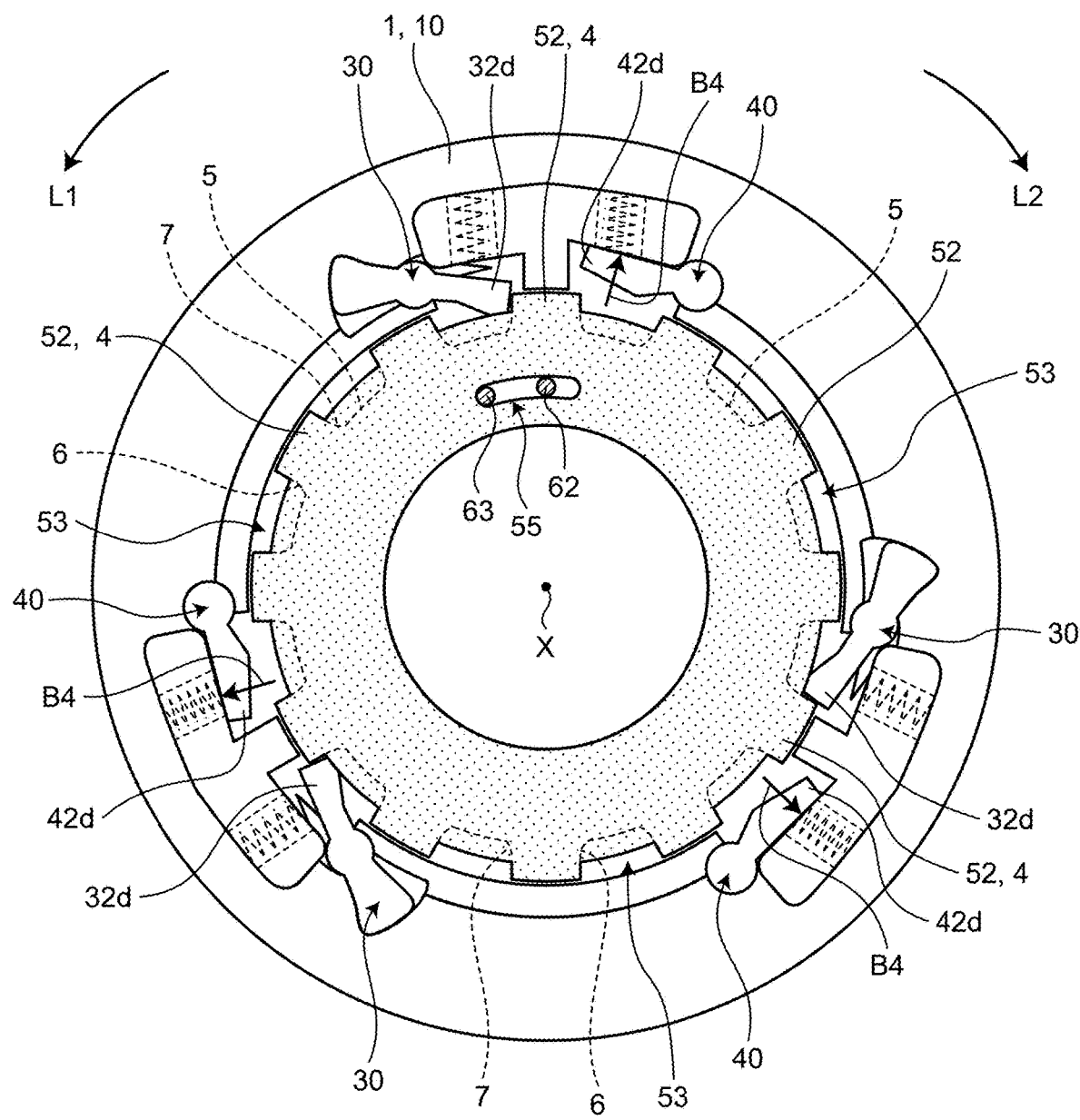
FIG. 10 is a schematic diagram illustrating a state in which rotation speeds of the inner ring and the outer ring are increased from the state of FIG. 9.

FIG. 10 is a schematic diagram illustrating a state in which rotation speeds of the outer ring 1 and the inner ring 2 are increased from the state of FIG. 9. When the rotation speeds of the outer ring 1 and the inner ring 2 in the first rotation direction L1 are increased from the state illustrated in FIG. 9, the centrifugal force acting on the second claw members 40 also is also increased. Thus, the second tip portions 42*d* move outward in the radial direction against biasing force of the second springs 45. That is, the second tip portions 42*d* of the second claw members 40 are released from the grooves 5. As a result, switching to the one-way clutch mode in which the outer ring 1 is rotatable in the first rotation direction L1 relative to the inner ring 2 is performed.

Figure 11:
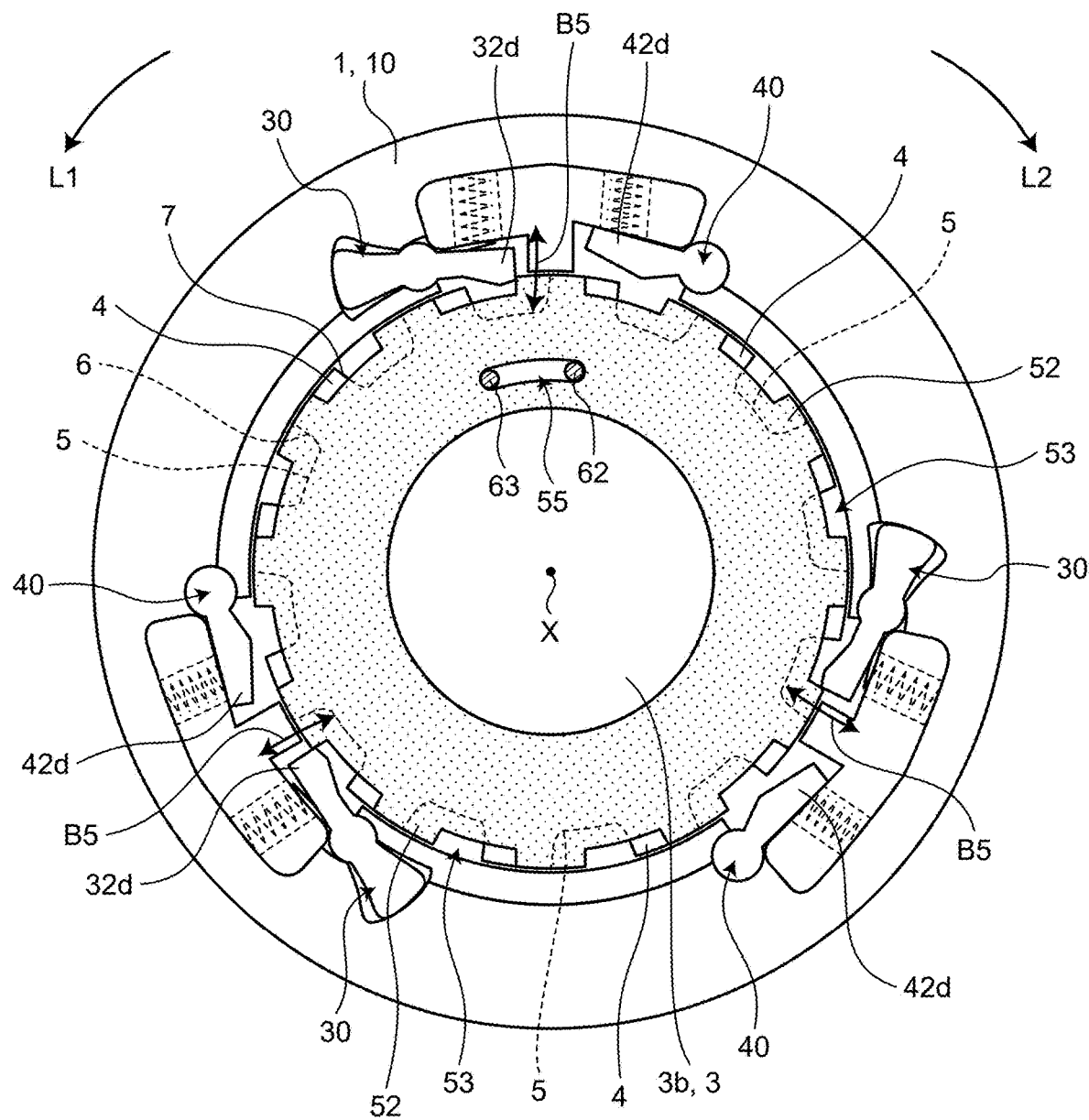
FIG. 11 is a schematic diagram illustrating a state in which the outer ring starts rotating in the first rotation direction relative to the inner ring from the state of FIG. 10.

FIG. 11 is a schematic diagram illustrating a state in which the outer ring 1 starts rotating in the first rotation direction L1 relative to the inner ring 2 from the state of FIG.

10. Then, as illustrated in FIG. 11, a rotation of a coupling member (not illustrated) coupled to the outer ring 1 is accelerated and a rotation speed of the outer ring 1 is increased, and the rotation speed of the outer ring 1 in the first rotation direction L1 becomes larger than that of the inner ring 2. As a result, the outer ring 1 rotates in the first rotation direction L1 relative to the inner ring 2. In addition, the first claw members 30 swing at this time (see arrows B5 in FIG. 11).

From the above, according to the ratchet type clutch device 100 of the first embodiment, the lock mode can be switched to the one-way clutch mode without utilization of the actuator and the cam member. Thus, the ratchet type clutch device 100 can be downsized.

Figure 12:
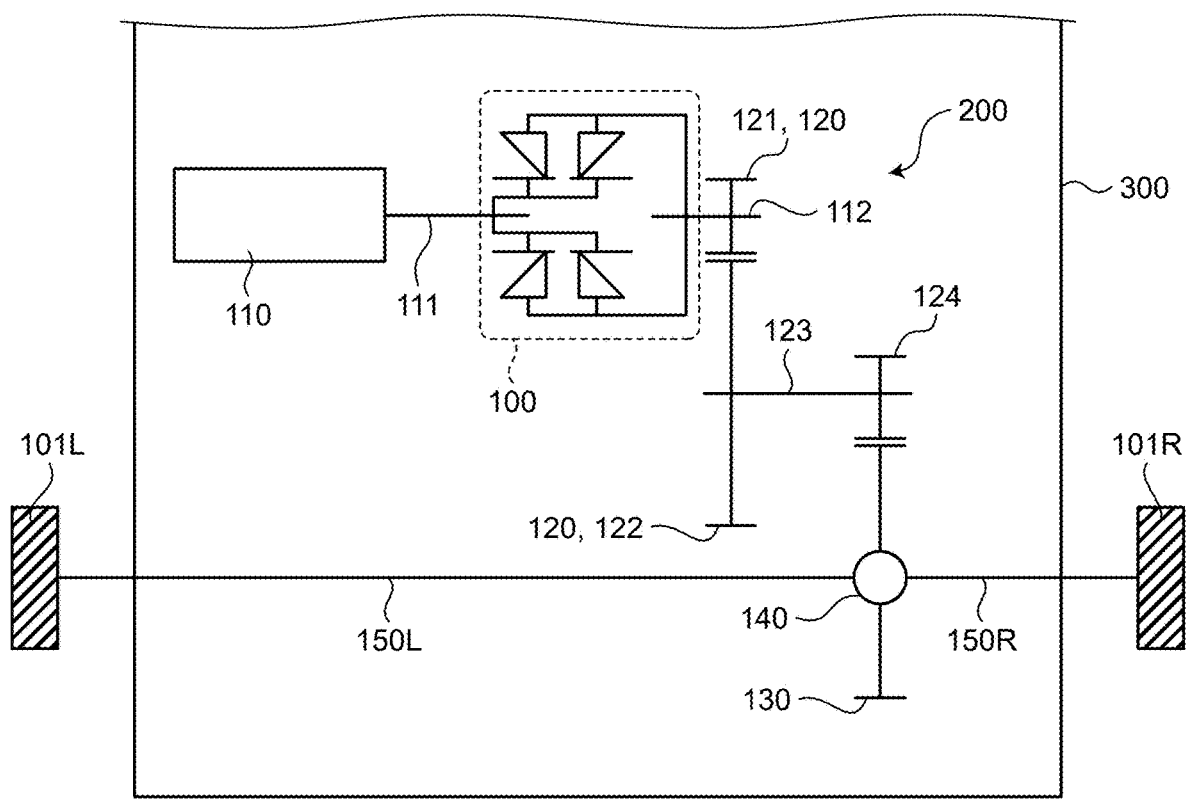
FIG. 12 is a view illustrating a configuration of a vehicle drive device of the first embodiment.

FIG. 12 is a view illustrating a configuration of the vehicle drive device 200 of the first embodiment. Next, the vehicle drive device 200 will be described. As illustrated in FIG. 12, the vehicle drive device 200 is mounted on a vehicle 300. Then, the vehicle drive device 200 drives wheels 101L and 101R that are driving wheels. The vehicle 300 includes a main driving source that generates main power, such as an engine and travels by driving wheels other than the wheels 101L and 101R. Thus, driving of the wheels 101L and 101R by the vehicle drive device 200 plays an auxiliary role in traveling of the vehicle 300.

The vehicle drive device 200 includes a motor 110, a reduction gear 120, an intermediate gear 124, a ring gear 130, a differential gear 140, axles 150L and 150R, and the ratchet type clutch device 100. In the present embodiment, the ratchet type clutch device 100 is interposed between the motor 110 and the reduction gear 120.

An output shaft 111 of the motor 110 is coupled to the inner ring main body 3 of the ratchet type clutch device 100 (see FIG. 1). In addition, a coupling shaft 112 is coupled to the outer ring main body 10 of the ratchet type clutch device 100 (see FIG. 1). Note that when the vehicle 300 moves forward, a direction of the torque input to the inner ring main body 3 of the ratchet type clutch device 100 is the first rotation direction L1. On the other hand, when the vehicle 300 moves backward, a direction of the torque input to the inner ring main body 3 of the ratchet type clutch device 100 is the second rotation direction L2.

The reduction gear 120 includes a first gear 121 and a second gear 122 engaged with the first gear 121. The second gear 122 has a larger diameter than the first gear 121. Thus, when the torque is transmitted from the first gear 121 to the second gear 122, the torque is decelerated. The first gear 121 is coupled to the coupling shaft 112. The second gear 122 is coupled to an intermediate shaft 123. In addition, the intermediate shaft 123 is coupled to the intermediate gear 124.

The intermediate gear 124 is engaged with the ring gear 130. The ring gear 130 has a larger diameter than the intermediate gear 124, and the torque is decelerated. In addition, the ring gear 130 is coupled to a differential case (not illustrated) of the differential gear 140.

The differential gear 140 is a device that absorbs a rotation difference between the wheels 101L and 101R. The differential gear 140 includes the differential case (not illustrated), a pinion shaft (not illustrated) that rotates integrally with the differential case, a pair of pinions (not illustrated) rotatably supported by the pinion shaft, and a pair of side gears (not illustrated) that engages with the pair of pinions. The axle 150L is coupled to one side gear of the pair of side gears, and the axle 150R is coupled to the other side gear.

Thus, the torque transmission path until the torque generated by the motor 110 is transmitted to the axles 150L and 150R is the ratchet type clutch device 100, the reduction gear 120, the intermediate gear 124, the ring gear 130, and the differential gear 140 in order from an upstream side. Note that the upstream side of the torque transmission path is a side of the motor 110, and a downstream side is a side of the wheels 101L and 101R.

Figure 13:
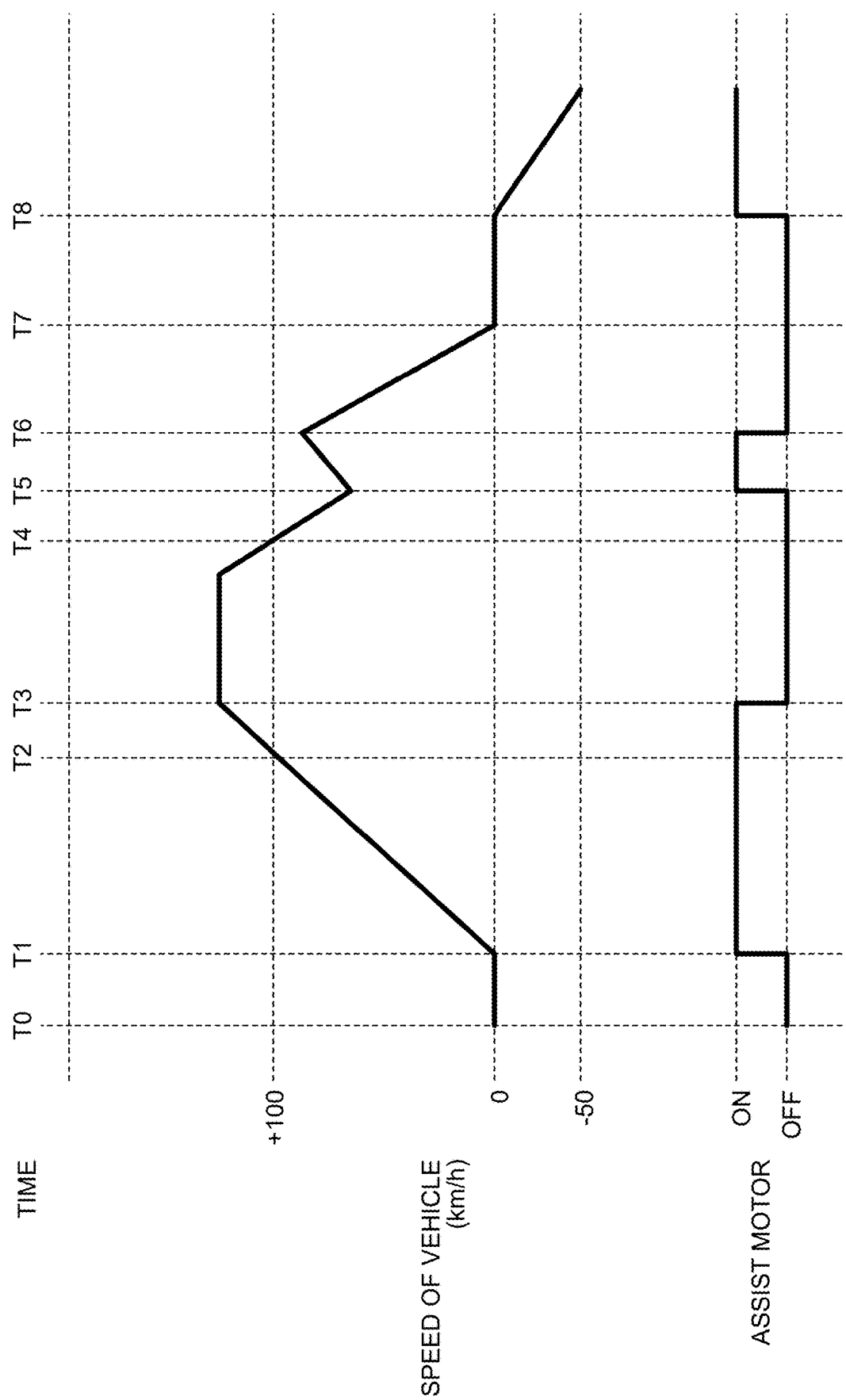
FIG. 13 is a view illustrating a time chart of the vehicle drive device of the first embodiment.

FIG. 13 is a view illustrating a time chart of the vehicle drive device of the first embodiment. Next, an operation of the vehicle drive device 200 will be described. As illustrated in FIG. 13, the vehicle 300 is stopped at time T0. In this case, the ratchet type clutch device 100 is in a state in which both the first claw members 30 and the second claw members 40 enter into the grooves 5 and can engage with the tooth portions 4 (lock mode (see FIG. 9)).

When the vehicle 300 moves forward at time T1, the motor 110 is driven. As a result, the torque in the first rotation direction L1 is input to the inner ring main body 3 of the ratchet type clutch device 100. Then, the first claw members 30 and the tooth portions 4 are engaged with each other, and the torque is transmitted to the outer ring main body 10 (see FIG. 9, specifically, an arrow B2 in FIG. 9). Thus, the outer ring 1 rotates in the first rotation direction L1 at a speed equal to that of the inner ring 2. Then, the torque of the outer ring 1 is transmitted in order of the reduction gear 120, the intermediate gear 124, the ring gear 130, the differential gear 140, and the axles 150, and the wheels 101L and 101R are driven.

Here, the speed of the vehicle 300 increases, and the rotation speeds of the outer ring 1 and the inner ring 2 also increase. Then, the centrifugal force acting on the second claw members 40 also increases. In the present embodiment, when the speed of the vehicle 300 exceeds 100 km/h (time T2), the second tip portions 42d of the second claw members 40 move outward in the radial direction against the biasing force of the second springs 45 due to the centrifugal force (see FIG. 10, specifically, an arrow B4 in FIG. 10). As a result, the second tip portions 42d of the second claw members 40 are released from the grooves 5. That is, the mode becomes the one-way clutch mode from the time T2 (see FIG. 10).

Note that although the second tip portions 42d of the second claw members 40 move outward in the radial direction in a case where the speed of the vehicle 300 exceeds 100 km/h in the present embodiment, the present disclosure is not limited thereto. The rotation speed of the outer ring 1 of when the second tip portions 42d of the second claw members 40 move outward in the radial direction is not specifically limited, and may be appropriately set.

At time T3, the speed of the vehicle 300 further increases, and assistance to the wheels 101L and 101R becomes unnecessary. Thus, the vehicle drive device 200 stops the driving of the motor 110 and also stops the rotation of the inner ring main body 3. On the other hand, since the wheels 101L and 101R roll on a road surface, the axles 150L and 150R continuously rotate in the same direction. Then, the torque that reaches the axles 150L and 150R from the wheels 101L and 101R is transmitted in order of the differential gear 140, the ring gear 130, the intermediate gear 124, the reduction gear 120, and the outer ring 1. That is, even after the driving of the motor 110 is stopped, the torque in the first rotation direction L1 is transmitted to the outer ring 1.

Here, the mode is the one-way clutch mode (see FIG. 10) at the time T2. Thus, the outer ring 1 rotates in the first rotation direction L1 relative to the inner ring 2. The first claw members 30 swing at this time (see an arrow B5 in FIG. 11). In addition, the engagement between the first claw members 30 and the restriction tooth portions 52 is released, and the shutter plate 50 is brought into the closed state.

When the speed of the vehicle 300 decreases, the centrifugal force acting on the second tip portions 42d of the second claw members 40 also decreases. At time T4, the centrifugal force acting on the second tip portions 42d of the second claw members 40 becomes smaller than the biasing force of the second springs 45, and the second tip portions 42d of the second claw members 40 move inward in the radial direction. However, the shutter plate 50 is in the closed state, and the second tip portions 42d of the second claw members 40 do not enter into the grooves 5 (see FIG. 7). Thus, the one-way clutch mode is maintained.

The motor 110 is driven at time T5. In addition, the motor 110 generates the torque in such a manner that the rotation speed of the inner ring 2 is larger than the rotation speed of the outer ring 1. As a result, the inner ring 2 rotates in the first rotation direction L1 relative to the outer ring 1. Then, the first tip portions 32d of the first claw members 30 enter into the grooves 5 and come into contact with the restriction tooth portions 52 (see FIG. 8). As a result, the restriction tooth portions 52 and the tooth portions 4 have the same phase, and the shutter plate 50 is brought into the open state. Then, the second tip portions 42d of the second claw members 40 enter into the grooves 5 and are brought into the lock mode (see FIG. 9).

At time T6, the vehicle 300 starts decelerating, and the motor 110 stops accordingly. Then, the vehicle 300 stops at time T7. Here, the speed of the vehicle 300 does not exceed 100 km/h from the time T5 to the time T7. That is, the release of the second tip portions 42d of the second claw members 40 from the grooves 5 due to the centrifugal force is not generated. Thus, the vehicle 300 is stopped in a state in which the lock mode is maintained. Note that the mode is the lock mode also at the time TO from these reasons.

At time T8, the vehicle 300 moves backward, and the motor 110 is driven. Note that the direction of the torque generated by the motor 110 at this time is opposite to that at the time of the forward movement of the vehicle 300 (second rotation direction L2). Thus, the second tip portions 42d of the second claw members 40 are engaged with the tooth portions 4, and the torque is transmitted to the outer ring main body 10. Then, the outer ring 1 rotates in the second rotation direction L2 at a speed equal to that of the inner ring 2. As a result, the torque is transmitted from the vehicle drive device 200, and the wheels 101L and 101R rotate in the direction opposite to that of when the vehicle 300 moves forward.

As described above, according to the vehicle drive device 200 of the first embodiment, when the vehicle 300 is traveling and the motor 110 is stopped (between the time T3 and the time T5), the mode is the one-way clutch mode. That is, the torque transmission path is disconnected by the ratchet type clutch device 100. Thus, since the output shaft 111 of the motor 110 and the inner ring 2 do not rotate, a rotation of a reverse input from the wheels 101L and 101R is not transmitted to the motor 110, and a load during traveling of the vehicle 300 is reduced.

The first embodiment has been described above. Next, modification examples in which a position of a ratchet type clutch device arranged on a torque transmission path of a vehicle drive device 200 is changed will be described. In each of the modification examples, only differences from the first embodiment will be described.

First Modification Example

Figure 14:
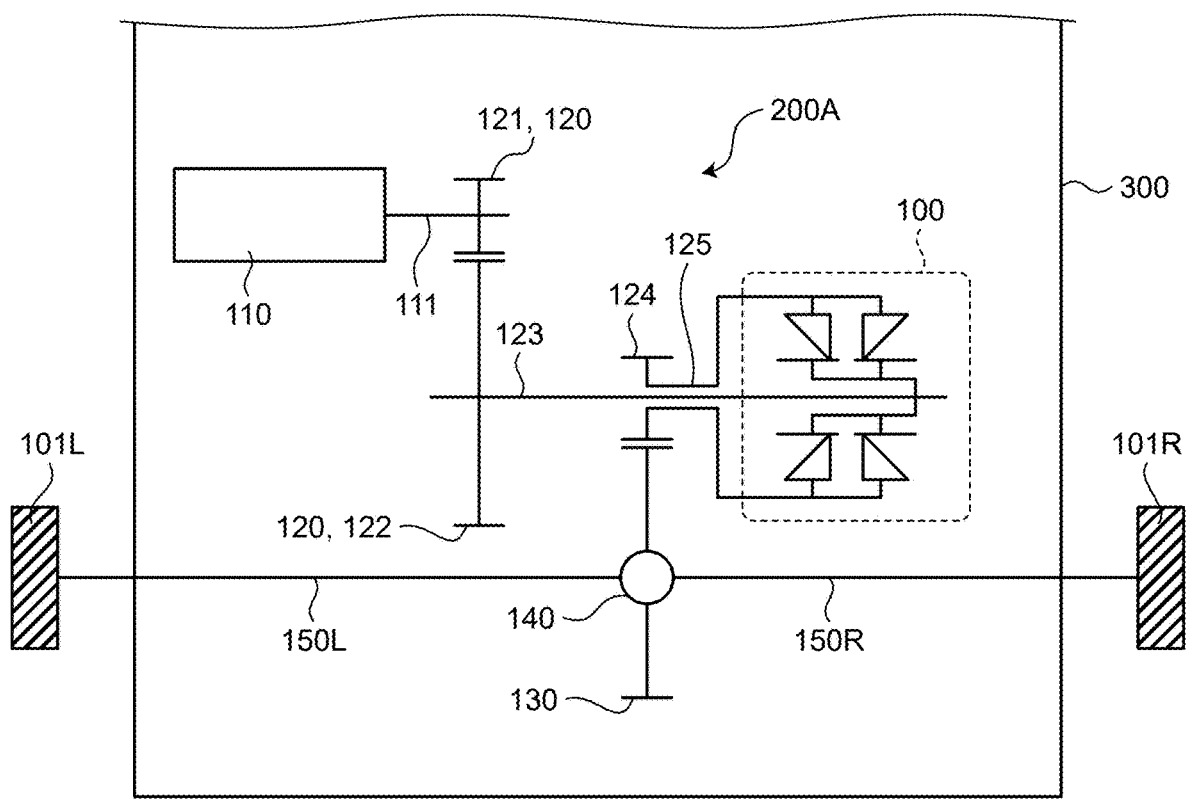
FIG. 14 is a view illustrating a configuration of a vehicle drive device of a first modification example.

FIG. 14 is a view illustrating a configuration of a vehicle drive device 200A of the first modification example. As illustrated in FIG. 14, the vehicle drive device 200A of the first modification example is different from that of the first embodiment in a point that a ratchet type clutch device 100 is interposed between an intermediate shaft 123 and an intermediate gear 124. Thus, in the first modification example, an output shaft 111 of a motor 110 is coupled to a first gear 121. The intermediate shaft 123 is coupled to an inner ring main body 3 of the ratchet type clutch device 100 (see FIG. 1). In addition, a second intermediate shaft 125 is coupled to an outer ring main body 10 of the ratchet type clutch device 100 (see FIG. 1). In addition, the intermediate gear 124 is coupled to the second intermediate shaft 125.

As described above, according to the vehicle drive device 200A of the first modification example, while a vehicle 300 is traveling and the motor 110 is stopped (see a period from time T3 to time T5 in FIG. 13), the output shaft 111 of the motor 110, a reduction gear 120, and an inner ring 2 do not rotate. Thus, a rotation of a reverse input from wheels 101L and 101R is not transmitted to the motor 110, and a load during traveling of the vehicle 300 is reduced.

Second Modification Example

Figure 15:
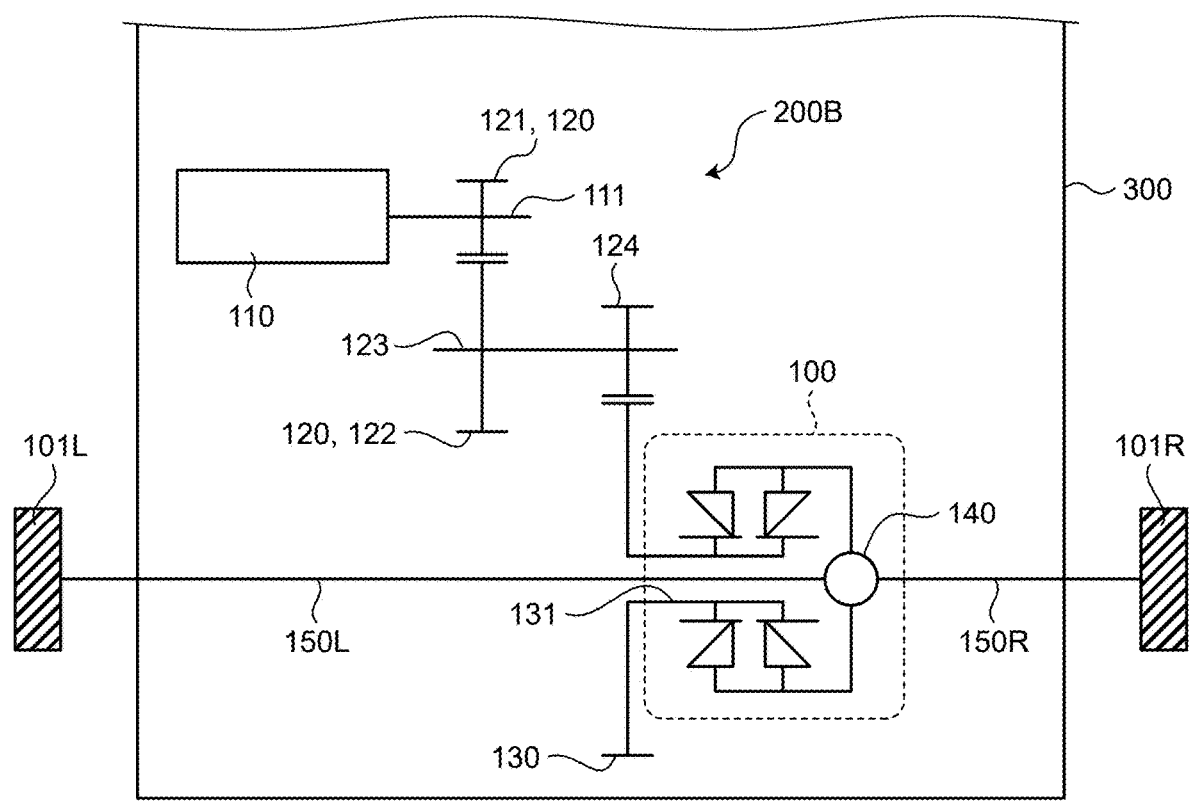
FIG. 15 is a view illustrating a configuration of a vehicle drive device of a second modification example.

FIG. 15 is a view illustrating a configuration of a vehicle drive device 200B of the second modification example. As illustrated in FIG. 15, the vehicle drive device 200B of the first modification example is different from that of the first embodiment in a point that a ratchet type clutch device 100 is interposed between a ring gear 130 and a differential gear 140. Thus, in the second modification example, a ring gear shaft 131 is coupled to the ring gear 130. The ring gear shaft 131 is coupled to an inner ring main body 3 of the ratchet type clutch device 100 (see FIG. 1). In addition, an outer ring main body 10 of the ratchet type clutch device 100 (see FIG. 1) is coupled to a differential case of a differential gear 140.

According to the vehicle drive device 200B of the second modification example, when a vehicle 300 is traveling and a motor 110 is stopped (see a period from time T3 to time T5 in FIG. 13), an output shaft 111 of the motor 110, a reduction gear 120, an intermediate gear 124, the ring gear 130, and an inner ring 2 do not rotate. Thus, a rotation of a reverse input from wheels 101L and 101R is not transmitted to the motor 110, and a load during traveling of the vehicle 300 is reduced.

Third Modification Example

Figure 16:
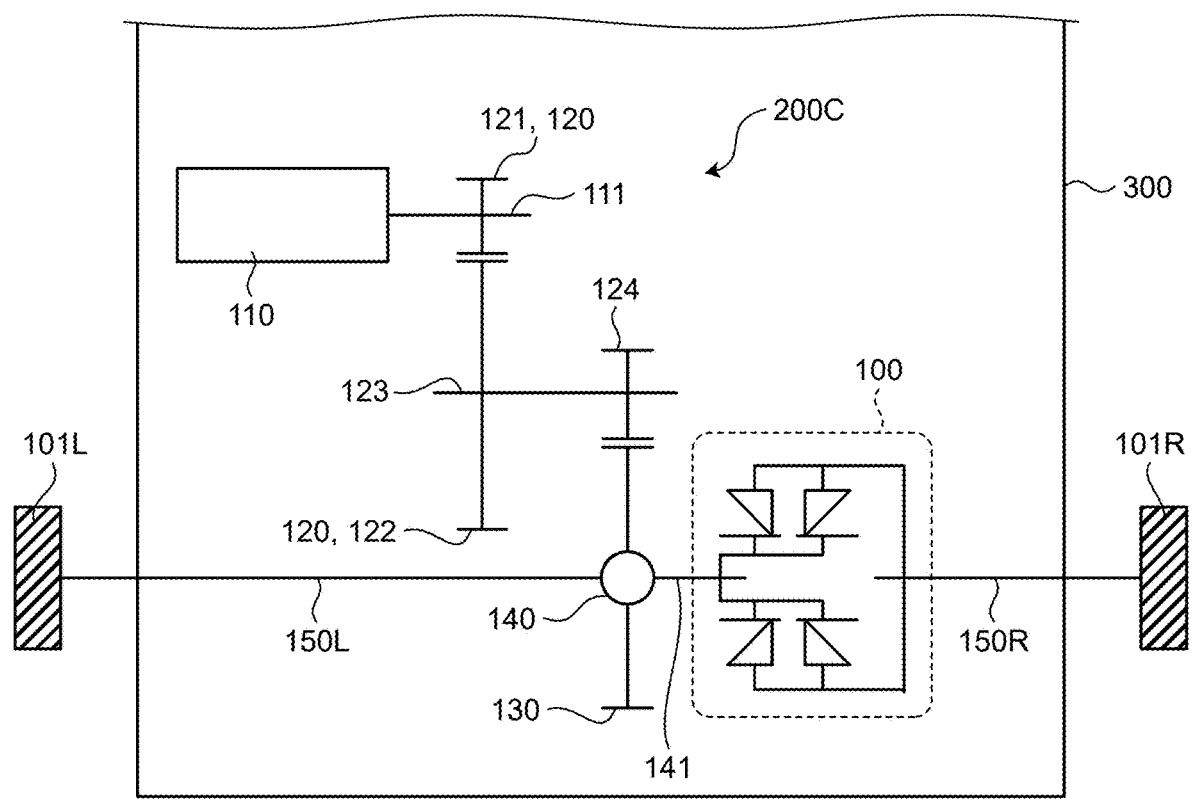
FIG. 16 is a view illustrating a configuration of a vehicle drive device of a third modification example.

FIG. 16 is a view illustrating a configuration of a vehicle drive device 200C of the third modification example. As illustrated in FIG. 16, the vehicle drive device 200C of the third modification example is different from that of the first embodiment in a point that a ratchet type clutch device 100 is interposed between a differential gear 140 and a wheel 101R. Thus, in the differential gear 140 of the third modification example, a transmission shaft 141 is coupled to one of a pair of side gears (not illustrated). The transmission shaft 141 is coupled to an inner ring main body 3 of the ratchet type clutch device 100 (see FIG. 1). An axle 150R is coupled to an outer ring 1 of the ratchet type clutch device 100 (see FIG. 1).

In the third modification example, when the vehicle 300 is traveling and the motor 110 is stopped (see a period from time T3 to time T5 in FIG. 13), the vehicle drive device 200C is in a one-way clutch mode. Thus, the outer ring 1 coupled to the axle 150R rotates in a first rotation direction L1. In addition, torque of the outer ring 1 is not transmitted to an inner ring 2.

Furthermore, a rotation direction of an axle 150L is the same first rotation direction L1 as the axle 150R. Here, since the motor 110 is stopped, a rotation of a differential case (not illustrated) is stopped. Thus, the side gear coupled to the axle 150R and the side gear coupled to the transmission shaft 141 rotate in directions opposite to each other. That is, the transmission shaft 141 rotates in a second rotation direction L2. Thus, the inner ring 2 rotates in the second rotation direction L2 opposite to the outer ring 1. Since being in the one-way clutch mode, torque of the inner ring 2 is not transmitted to the outer ring 1.

From the above, according to the third modification example, when the vehicle 300 is traveling and the motor 110 is stopped (see the period from the time T3 to the time T5 in FIG. 13), a reduction gear 120, an intermediate gear 124, a ring gear 130, and the differential case (not illustrated) of the differential gear 140 do not rotate. Thus, a rotation of a reverse input from wheels 101L and 101R is not transmitted to the motor 110, and a load during traveling of the vehicle 300 is reduced.

The modification examples of the vehicle drive device 200 has been described above. Next, a modification example of the ratchet type clutch device 100 will be described.

Fourth Modification Example

Figure 17:
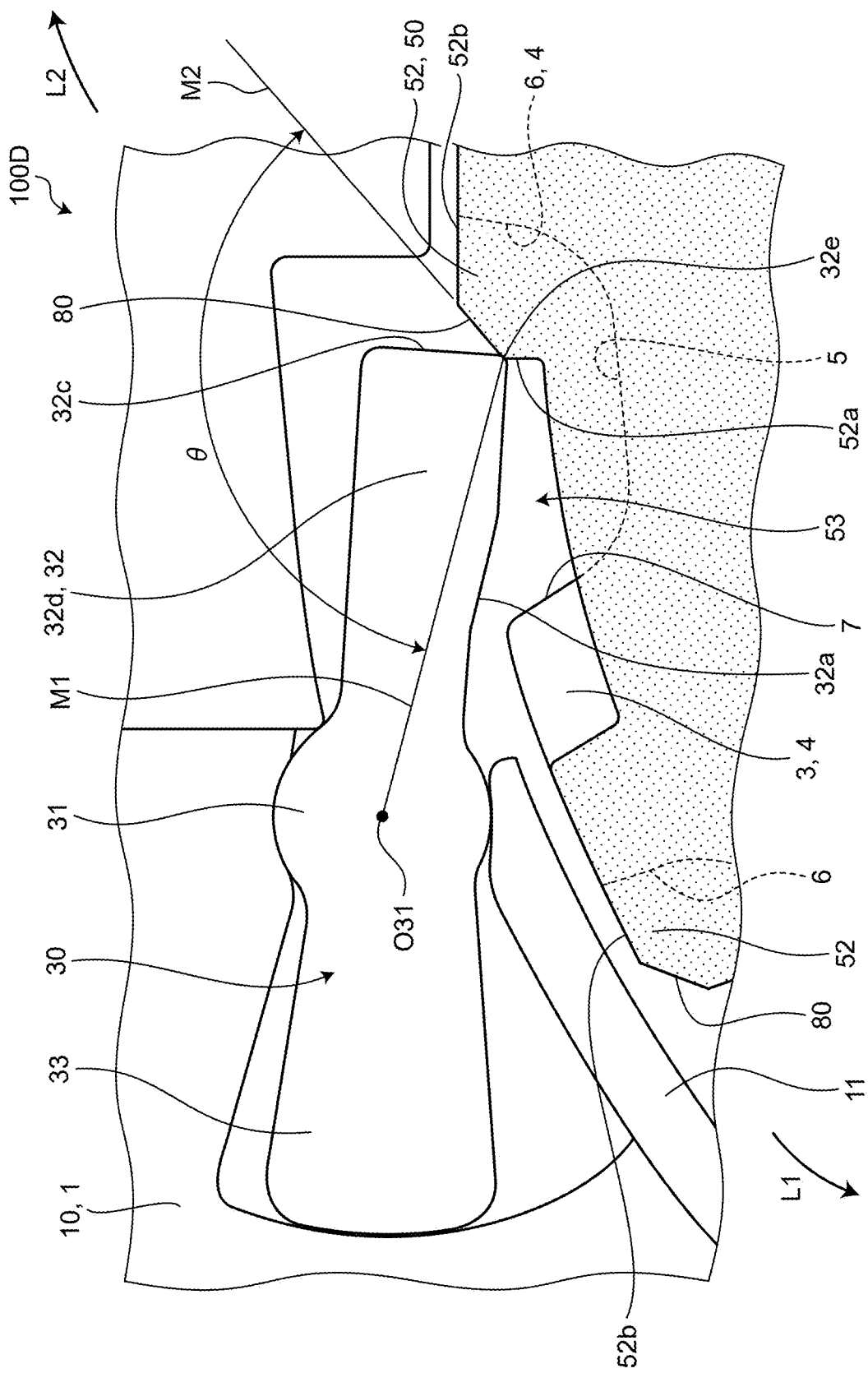
FIG. 17 is an enlarged view enlarging a first claw member and a vicinity thereof in a ratchet type clutch device of a fourth modification example.

FIG. 17 is an enlarged view enlarging a first claw member 30 and a vicinity thereof in a ratchet type clutch device 100D of the fourth modification example. As illustrated in FIG. 17, the ratchet type clutch device 100D of the fourth modification example is different from that of the first embodiment in a point that an inclined surface 80 is formed on a restriction tooth portion 52 of a shutter plate 50.

The restriction tooth portion 52 has a side surface 52a facing a first rotation direction L1 and an outer diameter surface 52b facing outward in a radial direction. Note that the side surface 52a is a surface in contact with a first tip portion 32d of the first claw member 30 (see FIG. 8). The inclined surface 80 is arranged at a corner portion where the side surface 52a and the outer diameter surface 52b intersect. The inclined surface 80 is inclined so as to be located more inward in the radial direction toward a first rotation direction L1. Next, an effect of the ratchet type clutch device 100D of the fourth modification example will be described.

Figure 18:
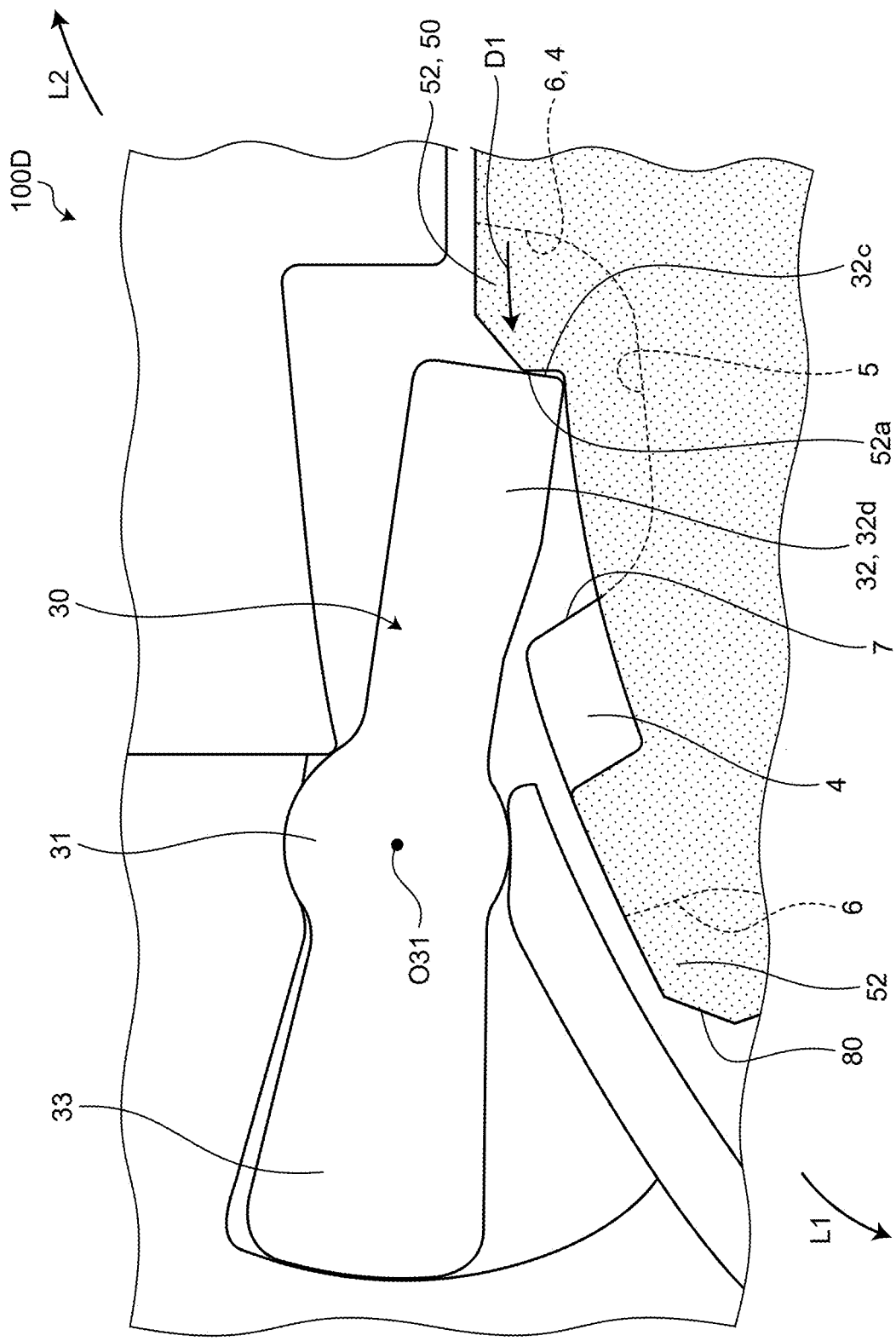
FIG. 18 is a view illustrating a state in which a short first claw member enters into a groove in the fourth modification example.
Figure 19:
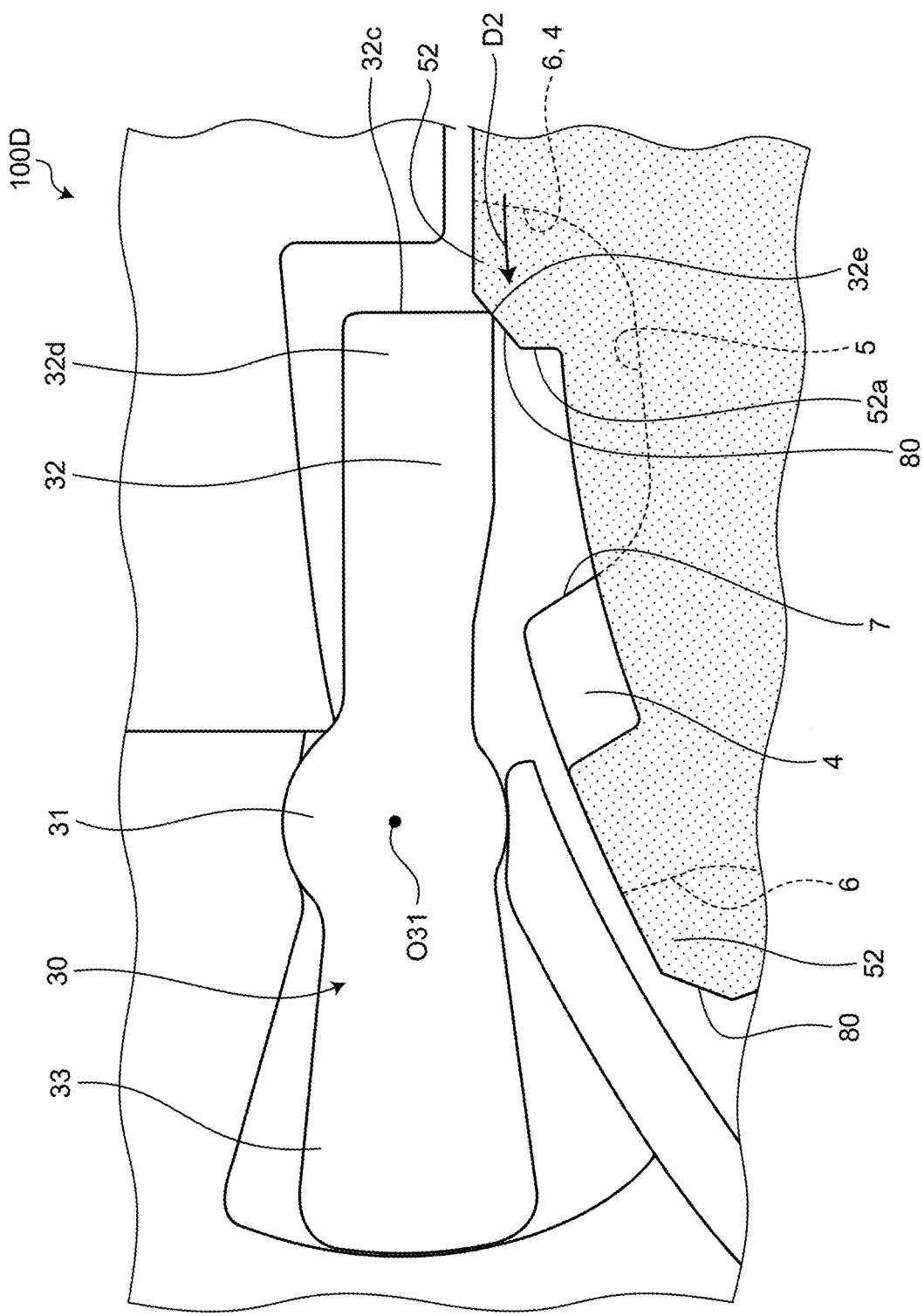
FIG. 19 is a view illustrating a state in which a long first claw member abuts on an inclined surface in the fourth modification example.

FIG. 18 is a view illustrating a state in which a short first claw member 30 enters into a groove 5 in the fourth modification example. FIG. 19 is a view illustrating a state in which a long first claw member 30 abuts on the inclined surface 80 in the fourth modification example.

The first claw members 30 have a variation (tolerance) in length in a longitudinal direction in a manufacturing process. Thus, the plurality of first claw members 30 includes the first claw member 30 having a small length in the longitudinal direction (hereinafter, simply referred to as "short") (see FIG. 18) and the first claw member 30 having a large length in the longitudinal direction (hereinafter, simply referred to as "long") (see FIG. 19).

In a case where an inner ring 2 rotates in the first rotation direction L1 relative to an outer ring 1, a first tip portion 32d of the short first claw member 30 of the plurality of first claw members 30 enters into the groove 5 as illustrated in FIG. 18. Then, an end surface 32c comes into contact with the side surface 52a.

On the other hand, at the time point at which the short first claw member 30 comes into contact with the restriction tooth portion 52, the long first claw member 30 has a short distance to the side surface 52a and cannot enter into the groove 5. Thus, as illustrated in FIG. 19, a first tip portion 32d of the first claw member 30 is in a state of abutting on the inclined surface 80.

Specifically, in a first claw portion 32, a corner portion 32e where an inner surface 32a and the end surface 32c intersect is in a state of abutting on the inclined surface 80 of the restriction tooth portion 52. Note that the first claw portion 32 is biased inward in the radial direction by a first spring 35 (see FIG. 3 and the like). Thus, a state in which the corner portion 32e abuts on the inclined surface 80 is maintained.

From the above, the rotation of shutter plate 50 is restricted not by the long first claw member 30 but by the short first claw member 30. Then, when only an inner ring main body 3 further rotates in the first rotation direction L1, as illustrated in FIG. 18, one side surface 6 of a tooth portion 4 moves in the first rotation direction L1 (see an arrow D1 in FIG. 18). Then, the one side surface 6 of the tooth portion 4 comes into contact with the first tip portion 32d of the first claw member 30, and the short first claw member 30 and the tooth portion 4 are engaged with each other.

Similarly, as illustrated in FIG. 19, when moving in the first rotation direction L1 (see an arrow D2 in FIG. 19), the one side surface 6 of the tooth portion 4 also comes into contact with the corner portion 32e abutting on the inclined surface 80. As a result, the long first claw member 30 and the tooth portion 4 are engaged with each other.

Thus, according to the fourth modification example, it is avoided that the long first claw member 30 comes into contact with the corner portion of the restriction tooth portion 52 and is flipped outward in the radial direction. Thus, the number of the first claw members 30 engaged with the tooth portions 4 is increased as compared with the first embodiment. Then, application of a load to only some first claw members 30 among the plurality of first claw members 30 is avoided.

In addition, as illustrated in FIG. 17, a straight line connecting the corner portion 32e of the first claw member 30 and a rotation center O31 of the first claw member 30 is referred to as a virtual line M1. Furthermore, a straight line drawn along the inclined surface 80 is referred to as a virtual line M2. An angle θ at which the virtual line M1 and the virtual line M2 intersect is preferably 90° or more. Accordingly, the inclined surfaces 80 become long, and the first claw members 30 that abut on the inclined surfaces 80 of the restriction tooth portions 52, in other words, the first claw members 30 engaged with the tooth portions 4 are increased.

Although the embodiment and the modification examples have been described above, the present disclosure is not limited to the examples described in the embodiment. For example, although having the case 70 to support the elastic member 60, the inner ring 2 of the embodiment may not have the case 70 as long as the elastic member 60 can be supported by the inner ring main body 3 or the shutter plate 50. Furthermore, a shape of the elastic member 60 is not limited to the shape described in the embodiment.

In the present disclosure, when the inner ring rotates in the first rotation direction relative to the outer ring, the first claw member enters into the groove. Then, the first claw member restricts the rotation of the shutter plate. As a result, only the inner ring main body rotates in the first rotation direction, and the restriction tooth portion and the tooth portion overlap with each other. Thus, the shutter plate is brought into an open state, and the second claw member enters into the groove (becomes the lock mode). In addition, when the rotation speeds of the inner ring and the outer ring increase, the second claw member is released from the groove by centrifugal force (becomes the one-way clutch mode). When the outer ring rotates in the first rotation direction relative to the inner ring in this state, the contact between the first claw member and the restriction tooth portion is released, and the shutter plate is brought into a closed state. Thus, the one-way clutch mode is maintained. As described above, the actuator and the like are unnecessary and downsizing is achieved according to the present disclosure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ratchet type clutch device comprising:
an outer ring and an inner ring that are relatively rotatable, the inner ring having tooth portions and grooves that are alternately formed on an outer peripheral surface thereof in a circumferential direction, wherein
the outer ring includes:
a plurality of first claw members that enters into the respective grooves and engages with the respective tooth portions from a first rotation direction; and
a plurality of second claw members that enters into the respective grooves and engages with the respective tooth portions from a second rotation direction,
the inner ring includes:
an inner ring main body in which the tooth portions and the grooves are formed;
a shutter plate that is arranged coaxially with the inner ring main body and is rotatable relative to the inner ring main body; and
an elastic member that biases the shutter plate in a rotation direction,
the shutter plate has a plurality of restriction tooth portions that is arranged at equal intervals with the tooth portions and is formed on an outer peripheral surface thereof,
a direction parallel to a rotation axis of the outer ring is set as an axial direction,
a state in which the restriction tooth portions are misaligned in the first rotation direction with respect to the tooth portions and overlap with a part of the grooves when viewed from the axial direction is set as a closed state of the shutter plate,
a state in which all of the restriction tooth portions overlap with the tooth portions when viewed from the axial direction is set as an open state of the shutter plate,
the elastic member biases the shutter plate to switch the state from the open state to the closed state,
each of the first claw members is formed to be able to enter into the corresponding groove in the closed state, and
each of the second claw members is formed to be able to enter into the corresponding groove in the open state, a center of gravity is arranged closer to a tip portion than a rotation center of the corresponding second claw member, and the second claw members are released from the respective grooves when a centrifugal force of a predetermined value or more acts.

2. The ratchet type clutch device according to claim 1, wherein
each of the restriction tooth portions includes:
an outer diameter surface facing outward in a radial direction;
a side surface facing the first rotation direction; and
a corner portion where the outer diameter surface and the side surface intersect with each other, and
the corner portion is an inclined surface located more inward in the radial direction toward the first rotation direction.

3. A vehicle drive device that transmits torque generated by a motor to a pair of axles via a reduction mechanism, an intermediate gear, a ring gear, and a differential gear, the vehicle drive device comprising:
the ratchet type clutch device according to claim 2 that is provided on a torque transmission path from the motor to the axles, wherein
the inner ring is coupled to a part on an upstream side of the torque transmission path, and
the outer ring is coupled to a part on a downstream side of the torque transmission path.

4. The vehicle drive device according to claim 3, wherein the reduction mechanism includes:
a first gear;
a second gear that engages with the first gear and has a larger diameter than that of the first gear; and
a coupling shaft coupled to the first gear,
the part on the upstream side of the torque transmission path includes an output shaft of the motor, and
the part on the downstream side of the torque transmission path includes the coupling shaft.

5. The vehicle drive device according to claim 3, wherein the reduction mechanism includes:
a first gear;
a second gear that engages with the first gear and has a larger diameter than that of the first gear; and
an intermediate shaft coupled to the second gear,
the intermediate gear is coupled to a second intermediate shaft,
the part on the upstream side of the torque transmission path includes the intermediate shaft, and
the part on the downstream side of the torque transmission path includes the second intermediate shaft.

6. The vehicle drive device according to claim 3, wherein the ring gear is coupled to a ring gear shaft,
the part on the upstream side of the torque transmission path includes the ring gear shaft, and
the part on the downstream side of the torque transmission path includes a differential case of the differential gear.

7. The vehicle drive device according to claim 3, wherein the differential gear includes:
a differential case;
a pinion shaft that rotates integrally with the differential case;
a pair of pinions rotatably supported by the pinion shaft; and
a pair of side gears engaged with the pair of pinions,
the pair of side gears is coupled to a transmission shaft and one axle of the pair of axles,
the part on the upstream side of the torque transmission path includes the transmission shaft, and
the part on the downstream side of the torque transmission path includes another axle of the pair of axles.

8. A vehicle drive device that transmits torque generated by a motor to a pair of axles via a reduction mechanism, an intermediate gear, a ring gear, and a differential gear, the vehicle drive device comprising:
the ratchet type clutch device according to claim 1 that is provided on a torque transmission path from the motor to the axles, wherein
the inner ring is coupled to a part on an upstream side of the torque transmission path, and the outer ring is coupled to a part on a downstream side of the torque transmission path.

9. The vehicle drive device according to claim 8, wherein the reduction mechanism includes:
a first gear;
a second gear that engages with the first gear and has a larger diameter than that of the first gear; and
a coupling shaft coupled to the first gear,
the part on the upstream side of the torque transmission path includes an output shaft of the motor, and
the part on the downstream side of the torque transmission path includes the coupling shaft.

10. The vehicle drive device according to claim 8, wherein
the reduction mechanism includes:
a first gear;
a second gear that engages with the first gear and has a larger diameter than that of the first gear; and
an intermediate shaft coupled to the second gear,
the intermediate gear is coupled to a second intermediate shaft,
the part on the upstream side of the torque transmission path includes the intermediate shaft, and
the part on the downstream side of the torque transmission path includes the second intermediate shaft.

11. The vehicle drive device according to claim 8, wherein the ring gear is coupled to a ring gear shaft,
the part on the upstream side of the torque transmission path includes the ring gear shaft, and
the part on the downstream side of the torque transmission path includes a differential case of the differential gear.

12. The vehicle drive device according to claim 8, wherein
the differential gear includes:
a differential case;
a pinion shaft that rotates integrally with the differential case;
a pair of pinions rotatably supported by the pinion shaft; and
a pair of side gears engaged with the pair of pinions,
the pair of side gears is coupled to a transmission shaft and one axle of the pair of axles,
the part on the upstream side of the torque transmission path includes the transmission shaft, and
the part on the downstream side of the torque transmission path includes another axle of the pair of axles.

* * * * *